(12) United States Patent
Sullivan et al.

(10) Patent No.: US 9,529,409 B2
(45) Date of Patent: Dec. 27, 2016

(54) METHOD FOR PRODUCING A COLOR IMAGE AND IMAGING DEVICE EMPLOYING SAME

(71) Applicant: Entertainment Experience LLC, Reno, NV (US)

(72) Inventors: James R. Sullivan, St. Augustine, FL (US); Rodney L. Heckaman, Beaufort, SC (US)

(73) Assignee: Entertainment Experience LLC, Reno, NV (US)

( * ) Notice: Subject to any disclaimer, the term of this patent is extended or adjusted under 35 U.S.C. 154(b) by 0 days.

(21) Appl. No.: 14/511,536

(22) Filed: Oct. 10, 2014

(65) Prior Publication Data

US 2015/0022567 A1 Jan. 22, 2015

Related U.S. Application Data

(63) Continuation of application No. 13/692,066, filed on Dec. 3, 2012, now Pat. No. 8,860,751, which is a (Continued)

(51) Int. Cl.
*G09G 5/02* (2006.01)
*G09G 5/06* (2006.01)
(Continued)

(52) U.S. Cl.
CPC ........... *G06F 1/3265* (2013.01); *G06T 11/001* (2013.01); *G09G 3/2003* (2013.01); *G09G 5/02* (2013.01);
(Continued)

(58) Field of Classification Search
CPC combination set(s) only.
See application file for complete search history.

(56) References Cited

U.S. PATENT DOCUMENTS

| | | |
|---|---|---|
| 4,500,919 A | 2/1985 | Schreiber |
| 5,272,468 A | 12/1993 | Read |

(Continued)

FOREIGN PATENT DOCUMENTS

| | | |
|---|---|---|
| JP | 2004-157302 A1 | 6/2004 |
| JP | 2007-272146 A1 | 10/2007 |

(Continued)

OTHER PUBLICATIONS

Chapter 8, "Projection," of "Digital Cinema System Specification" Version 1.2, Digital Cinema Initiatives LLC, Mar. 7, 2008.

(Continued)

*Primary Examiner* — Wesner Sajous
(74) *Attorney, Agent, or Firm* — John M. Hammond; Patent Innovations LLC

(57) ABSTRACT

A method of producing a color image using a display comprised of pixels comprising red, green and blue primary color subpixels. The method comprises reducing the color gamut and increasing the brightness of the image relative to a base level, decreasing power to the display to reduce the brightness of the image, restoring color to the image to approximately the base level by modifying image pixel data using a three-dimensional lookup table to produce output image pixel data, and communicating the output image pixel data to the display. The display may be an LCD display, an LED display, an OLED display, a plasma display, and a DMD projector. Reducing the color gamut and increasing the brightness of the image may be accomplished by adding white to the image. The white may be added adaptively according to an algorithm by which the amount of white added decreases with increasing color saturation.

25 Claims, 20 Drawing Sheets
(3 of 20 Drawing Sheet(s) Filed in Color)

Related U.S. Application Data continuation-in-part of application No. 12/869,624, filed on Aug. 26, 2010, now Pat. No. 8,520,023.

(60) Provisional application No. 61/238,706, filed on Sep. 1, 2009.

(51) Int. Cl.

| | | |
|---|---|---|
| *G06T 11/00* | (2006.01) | |
| *G06T 5/00* | (2006.01) | |
| *H04N 1/60* | (2006.01) | |
| *H04N 5/57* | (2006.01) | |
| *H04N 5/58* | (2006.01) | |
| *H04N 9/64* | (2006.01) | |
| *H04N 9/77* | (2006.01) | |
| *G06F 1/32* | (2006.01) | |
| *G09G 3/20* | (2006.01) | |

(52) U.S. Cl.
CPC ........ *G09G 5/06* (2013.01); *G09G 2320/0233* (2013.01); *G09G 2320/066* (2013.01); *G09G 2320/0626* (2013.01); *G09G 2320/0666* (2013.01); *G09G 2330/023* (2013.01); *G09G 2340/06* (2013.01)

(56) References Cited

U.S. PATENT DOCUMENTS

| | | | |
|---|---|---|---|
| 5,592,188 A | 1/1997 | Doherty et al. | |
| 6,262,744 B1 | 7/2001 | Carrein | |
| 6,594,388 B1 * | 7/2003 | Gindele | H04N 1/6027 358/520 |
| 6,611,297 B1 | 8/2003 | Akashi et al. | |
| 6,791,716 B1 * | 9/2004 | Buhr | H04N 1/6075 358/1.9 |
| 6,897,876 B2 | 5/2005 | Murdoch et al. | |
| 7,091,523 B2 | 8/2006 | Cok et al. | |
| 7,262,753 B2 | 8/2007 | Tanghe et al. | |
| 7,292,252 B2 | 11/2007 | Matsuda | |
| 7,314,283 B2 | 1/2008 | Tsukada | |
| 7,348,992 B2 | 3/2008 | Kim et al. | |
| 7,362,336 B2 | 4/2008 | Miller et al. | |
| 7,397,485 B2 | 7/2008 | Miller et al. | |
| 7,414,633 B2 | 8/2008 | Sato et al. | |
| 7,425,964 B2 | 9/2008 | Chen et al. | |
| 7,777,760 B2 * | 8/2010 | Marcu | G09G 5/02 345/586 |
| 8,000,525 B2 | 8/2011 | Kuwahara et al. | |
| 8,045,796 B2 * | 10/2011 | Matsuoka | H04N 1/6052 345/600 |
| 8,520,023 B2 * | 8/2013 | Sullivan | G06T 11/001 345/589 |
| 8,767,006 B2 * | 7/2014 | Sullivan | G06T 11/001 345/589 |
| 2002/0044150 A1 | 4/2002 | Sato et al. | |
| 2002/0154138 A1 | 10/2002 | Wada | |
| 2003/0001815 A1 | 1/2003 | Cui | |
| 2003/0020725 A1 | 1/2003 | Matsuda | |
| 2003/0053088 A1 | 3/2003 | Kanai et al. | |
| 2003/0234794 A1 | 12/2003 | Kanai | |
| 2004/0080938 A1 | 4/2004 | Holman et al. | |
| 2004/0135790 A1 | 7/2004 | Moore | |
| 2004/0178974 A1 | 9/2004 | Miller et al. | |
| 2005/0068464 A1 | 3/2005 | Pettitt et al. | |
| 2005/0190198 A1 | 9/2005 | Koyama | |
| 2006/0098025 A1 | 5/2006 | Jang et al. | |
| 2006/0250411 A1 | 11/2006 | Oh | |
| 2006/0274386 A1 | 12/2006 | Wakazono et al. | |
| 2007/0165048 A1 | 7/2007 | Yamashita et al. | |
| 2007/0216812 A1 | 9/2007 | Shimizu | |
| 2007/0222740 A1 | 9/2007 | Hanada | |
| 2007/0229532 A1 | 10/2007 | Koyama | |
| 2007/0252849 A1 | 11/2007 | Wang | |
| 2008/0043260 A1 | 2/2008 | Ramanath et al. | |
| 2008/0049048 A1 | 2/2008 | Credelle et al. | |
| 2008/0055334 A1 | 3/2008 | Matsuoka et al. | |
| 2008/0143736 A1 | 6/2008 | Clatanoff et al. | |
| 2008/0252657 A1 | 10/2008 | Watanabe | |
| 2008/0259099 A1 | 10/2008 | Arai et al. | |
| 2008/0266314 A1 | 10/2008 | Butterworth | |
| 2008/0303918 A1 | 12/2008 | Keithley | |
| 2009/0009502 A1 | 1/2009 | Thebault et al. | |
| 2009/0122087 A1 | 5/2009 | Maruyama et al. | |
| 2009/0141971 A1 | 6/2009 | Pan | |
| 2009/0153745 A1 | 6/2009 | Park et al. | |
| 2009/0195566 A1 | 8/2009 | Miyazaki et al. | |
| 2009/0273614 A1 | 11/2009 | Higgins et al. | |
| 2009/0278867 A1 * | 11/2009 | Brown Elliott | G09G 3/3426 345/690 |
| 2009/0278982 A1 | 11/2009 | Imai et al. | |
| 2010/0245381 A1 | 9/2010 | Samadani et al. | |
| 2010/0265473 A1 | 10/2010 | Yamashita et al. | |
| 2010/0277401 A1 | 11/2010 | Takahara et al. | |
| 2012/0194537 A1 | 8/2012 | Huang et al. | |

FOREIGN PATENT DOCUMENTS

| | | |
|---|---|---|
| KR | 20110016154 A1 | 2/2011 |
| WO | 2005022927 A1 | 3/2005 |
| WO | 2005069638 A1 | 7/2005 |
| WO | 2007078563 A2 | 7/2007 |
| WO | 2007132635 A1 | 11/2007 |
| WO | 2008049907 A1 | 5/2008 |

OTHER PUBLICATIONS

"Introducing BrilliantColor(TM) Technology," David C. Hutchinson, Texas Instruments Inc. DLP(R) Products publication downloaded from Texas Instruments' website. Posting date unknown; PDF document properties indicate Dec. 27, 2005 creation date.

HSL and HSV. In Wikipedia. Retrieved Mar. 25, 2013, from http://en.wikipedia.org/wiki/HSL_and_HSV.

Haro et al.. "Visual Acuity in Day for Night." International Journal of Computer Vision archive, vol. 69 Issue 1, Aug. 2006.

International Search Report of PCT Application No. US2013/072962 issued Mar. 25, 2014.

Written Opinion of PCT Application No. US2013/072962 issued Mar. 25, 2014.

Office Action in U.S. Appl. No. 12/869,624, issued Jun. 14, 2013.

\* cited by examiner

METHOD FOR PRODUCING A COLOR IMAGE AND IMAGING DEVICE EMPLOYING SAME

CROSS-REFERENCE TO RELATED PATENT APPLICATIONS

This application is a continuation of U.S. patent application Ser. No. 13/692,066 filed Dec. 3, 2012 and issued as U.S. Pat. No. 8,860,751, which is a continuation-in-part of U.S. patent application Ser. No. 12/869,624 filed Aug. 26, 2010 and issued as U.S. Pat. No. 8,520,023, which claims priority from U.S. Provisional Patent Application No. 61/238,706 filed Sep. 1, 2009, the disclosures of which are incorporated herein by reference.

BACKGROUND

Technical Field

Processing and projection or display of color images on surfaces, on televisions, on game displays, on computers or by other electronic display media. In particular, methods and systems for display power savings, and extending battery life in color image display devices by managing color output while not degrading color image quality.

Description of Related Art

The projection and/or display of color images is an active area of commercial research and development. New image display, television, games, computers and projection products and viewing experiences are being launched in the marketplace on a regular basis. In one aspect of the marketplace, digital cinema or video projector technology that utilizes colored light emitting diodes (LEDs) as the source of the primary colors for imaging, offers the promise of extreme, wide color gamut along with very long life, low heat illumination. LED brightness is currently limited, however, requiring three optical systems and three image modulators, i.e., one for each of the red, green, and blue (RGB) color channels, for the brightest images. Current projector lamp technology is of higher brightness and can take advantage of single optical systems and single image modulators using complex color filter wheels to provide full color display. In a second aspect of the marketplace, televisions, game displays and computer displays such as liquid crystal displays (LCDs) are now being introduced with LEDs as the backlit light source to again take advantage of the extreme, wide color gamut, long life and low heat output of LEDs. In a third aspect of the marketplace, projectors, televisions, game displays and computer displays are being introduced with more than the typical three (RGB) colors to improve brightness and expand the color gamut. Such products offer the promise and technical challenge of how to best use the wide color gamut.

In a color image projector, in order to gain the advantage of the available wide color gamut, longer life, and lower heat of LED illumination, and to achieve maximum brightness with a single optical system and single image modulator, the multiple RGB channels may be combined for some portion of time during image frames to produce a white exposure during a pixel, or a portion of an image pixel area can include a clear filter area that transmits all of the LCD backlight spectrum for a $4^{th}$ white sub-pixel. Adding these multiple RGB channels during an image frame duty cycle or area will increase the brightness, but will also reduce the colorfulness by desaturating the pure RGB colors.

Furthermore, in prior art projectors, color rendering is accomplished by processing each of the RGB channels independently with matrix operators or with one-dimensional color look-up tables. In some projectors, the RGB colors and the combinations of two and three colors may be independently controlled. However, such control does not provide full three-dimensional color processing. With these limited processing options, it is not possible to display images optimally in human visual system (HVS) perceptual terms. For example, it is not possible to render visual lightness contrast without affecting either or both of hue and chroma. Achieving optimal visual processing that provides the brightest, most colorful images, while preserving perceived color accuracy requires three-dimensional color processing.

In providing any color image for viewing by a human observer, whether it is an image printed on a substrate, an electronic display, television, or a projection onto a viewing surface, the perception of color stimuli by the human observer is dependent upon a number of factors. In the International Lighting Vocabulary published in 1987 by the Commission Internationale de l'éclairage (CIE), it is noted as follows: "Perceived color depends upon the spectral distribution of the color stimulus, on the size, shape, structure, and surround of the stimulus area, on the state of adaptation of the observer's visual system, and on the observer's experience of the prevailing and similar situations of observations."

Moreover, in a treatise on the stained glassed windows at the cathedral at Chartres, *The Radiance of Chartres: Studies in the Early Stained Glass of the Cathedral*, (Columbia University Studies in Art History and Archaeology, No. 4), Random House, $1^{st}$ Ed., 1965, author James Rosser Johnson wrote that, " . . . the experience of seeing these windows . . . is a very complicated experience . . . that spans many aspects of perception." Yet fundamentally, " . . . when the spectator enters the Cathedral from the bright sunlight, . . . the visitor must step with caution until his eyes have made a partial dark adaptation . . . then the details of the interior will seem lighter and clearer while, at the same time, the [stained-glass] windows become richer and more intense."

Adaptation plays a powerful role in the instance depicted in Johnson's narrative. By adapting to the darkness or lower, perceived diffuse white of the cathedral's interior, the colors of the windows appear exceedingly brilliant, invoking a perception, in the words of Vincent Scully, Architecture, The Natural and Manmade, St. Martin's Press, 1991, that, " . . . transcend[s] the statics of the building masses, the realities of this world . . . [creating] a world of illusion, shaped by and for the heavenly light of the enormous stained glass windows." While such a perceptual experience is certainly complex and affected by the many characteristics of the human visual system (HVS), the richness of it is largely and simply made possible by the broad extent of sensitivity of the HVS and its innate ability to adapt to its surround.

The HVS is capable of adapting to an incredible range of luminance. For example, the HVS may adapt its light sensitivity over a range of about eight orders of magnitude, e.g., from a starlit, moonlit night having a luminance of about 0.0001 candela per square meter (cd/m2) to a brightly lit summer day of about 600 to 10,000 cd/m2. Equally remarkable is that the HVS may accommodate over five orders of magnitude of luminance at any given instant for the perception of complex visual fields that are routinely experienced. This adaptation occurs relative to diffuse white, i.e., an area in the scene that appears white. The perceptions of lightness and chroma are then relative to this white. The higher the brightness of the perceived white, the lower the brightness and chroma of similarly illuminated objects in the scene will appear to the observer; conversely, the lower its brightness, the brighter and more colorful such objects appear.

This means that changing the stimulus that appears white affects the appearance of all other stimuli in the scene. For a display or projection of an image, these powers of adaptation can be harnessed to expand the gamut of the medium in the perceptual sense. For any image display, and particularly single modulation LED displays such as those employing a digital micromirror device (DMD), the projected image can be made to appear brighter by the addition of light from combining RGB colors for some portion of the image frame time. In so doing, the powers of HVS adaptation are exploited to increase the apparent brightness and lightness contrast of the displayed images. For displays illuminated by red, green, and blue LEDs, although the added light reduces the actual display color gamut provided by the "LED primaries," the R, G, and B primary colors of the LEDs often exceed the current video standards, such as e.g., ITU Radiocommunication Sector (ITU-R) Recommendation BT.709, which is the United States standard for the format of high-definition television and consumer digital media. Thus some colors which are possible to output by the R, G, and B LEDs, or displays with more than three colors and extended color gamut are not available to be encoded in the input color data for display in accordance with such standards. Optimal use of these extended colors requires full three-dimensional color processing and can be further optimized using knowledge of the HVS. Prior attempts to process the current video standards, such as with one-dimensional color processing and color matrices, or without use of HVS models have resulted in unsatisfactory and unrealistic displayed images and high rates of product return by consumers.

Illustrative of some of these attempts, FIGS. 1A-1D are two-dimensional schematic diagrams of various prior art ways for processing input color data to produce output color data for rendering a color image. FIG. 1A shows a color hue/saturation/contrast/brightness method, depicting the global controls that rotate hue, stretch saturation and contrast and raise brightness. All colors are changed with these controls with no way to isolate a given color or color region like flesh tones. $R_{in}/G_{in}/W_{in}$ are input HD709 standard colors, and $R_{out}/G_{out}/W_{out}$ are more pure output LED Colors. There are four controls, and if each control is provided with 20 settings for example, there are 80 global choices.

FIG. 1B shows a color matrix method depicting a linear matrix global control that rotates and scales the color axes. All colors are changed globally with no way to isolate local colors like flesh tones. $R_{in}/G_{in}/W_{in}$ are input HD709 standard colors, and $R_{out}/G_{out}/W_{out}$ are more pure output LED colors. If a 3×3 matrix is used, there are nine global choices.

FIG. 1C shows a color gamma tables method depicting gamma global controls that independently maps each input color non-linearly to do things such as increase contrast. It can be seen that, e.g., red changes are the same for all green values. The same relationships occur with other combinations of primary colors. Thus gamma controls are global, with no way to locally isolate colors, such as flesh tones. $R_{in}/G_{in}/W_{in}$ are input HD709 standard colors, and $R_{out}/G_{out}/W_{out}$ are more pure output LED colors. With three primary colors having 4096 settings, there are 12288 global choices.

FIG. 1D shows a 2D example of an RGBCYMW seven color mapping method. In this simple example of 7-color tetrahedral processing, the RBG/RGW triangles are independently processed using linear interpolation of input/output control values at each vertices. This is a global control, with no way to isolate local colors or regions like flesh tones. $R_{in}/G_{in}/W_{in}$ are input HD709 standard colors, and $R_{out}/G_{out}/W_{out}$ are more pure output LED colors. With 14 In/Out colors, there are 14 global choices. $R_{in}/G_{in}/W_{in}$ are input HD709 standard colors, and $R_{out}/G_{out}/W_{out}$ are more pure output LED Colors.

Digital Cinema Initiatives, LLC (DCI) is a joint venture of major motion picture studios, which was formed in 2002 to create standards for digital cinema systems, including image capture and projection. The digital color standard adopted by the studios for professional movie releases in the DCI format is 12 bits per primary color, nonlinear CIE XYZ Tristimulus values. This is the first time that a digital standard has been established that is encoded in visual color space and therefore independent of any imaging device. For example, using this standard, the same digital file can be displayed to produce the specified color on a television or a printer. The color gamut of this digital color standard is larger than any possible display.

FIG. 3 is a diagram of color gamuts, including color gamuts of the DCI and HD709 standards, and color gamuts of various media and/or imaging devices. It can be seen that in diagram 400, the color gamuts 406, 408, 410, and 412 of the various imaging devices are substantially larger than the HD709 standard 404. Accordingly, to take full advantage of the color capabilities of these imaging devices 406-412, the color gamut of the HD709 standard must be mapped upwardly, to render the full colors of the larger color gamut, while simultaneously preserving flesh tones and other memory colors, and optimizing the particular device for viewing in a particular environment.

It can also be seen that the large triangular boundary 402 that represents the DCI standard encompasses all of the color gamuts of the media and/or imaging devices, as well as the color gamut of the HD709 standard 404. Accordingly, the digital color standard input color gamut 402 must be contracted or reduced to fit within the color gamut of a physical display such as a television or projector. Truncating or clipping those input digital color values of the DCI standard that lie outside of the color gamut boundary of the display device will cause loss of color saturation and detail and create a visually sub-optimal displayed image. Conventional video processing using one-dimensional color tables and linear matrices will also produce sub-optimal displayed images. Optimal display of these contracted colors requires full three-dimensional color processing and can be further optimized using knowledge of the HVS and the state of visual adaptation in particular viewing environments.

Also, image and video media display products are now being reduced in size. Examples of such products are the new miniature pico-projectors and portable, handheld displays such as iPods® or iPads®. Because of power, heat, and size limitations, these displays generally have reduced color gamuts due to reduced contrast or reduced color saturation. They also are often used in widely differing viewing environments both indoors and outdoors. Improvement of the overall quality of these smaller gamut displays with conventional image and video input is critical to product value. Conventional video processing using one-dimensional color tables and linear matrices will also produce sub-optimal displayed images. Optimal display of these contracted colors requires full three-dimensional color processing and can be further optimized using knowledge of the HVS and the state of visual adaptation in particular viewing environments.

Additionally, the capabilities of HVS adaptation are affected by the viewing environment. In a dark room, higher contrast is needed in a projected or displayed image for an equally perceived viewing experience as compared to a room with normal room lighting or viewing the same image in bright outdoor lighting. Relative to bright outdoor lighting, the HVS adaptation to the dark room and the lower overall image brightness combine to reduce the perceived image contrast. In a brightly lit room, less contrast is needed due to brightness adaptation and more contrast is needed due to viewing flare from room lights illuminating the dark areas of the displayed image.

In image displays, televisions, and/or projectors using high brightness light sources or expanded or reduced color gamuts, there is therefore a need in displaying and/or projecting images to optimize the increase in perceived brightness, contrast, and colorfulness while preserving expected memory colors of the displayed image such as flesh tones. Such an optimization should take into account that not all colors should be adjusted in the same manner and to the same extent. To do so would result in images containing certain details that appear unsatisfactory to a human observer. For example, if a flesh tone of a face in an image is modified in the same manner as a relatively saturated color of another object in the image, the face will be perceived as "pink," "orange," or "burnt" by an observer and thus will be perceived as unsatisfactory. There is therefore a need to achieve this optimization while also preserving certain known colors, such as flesh tones, grey tones, named colors (such as commercial "brand" colors), and other "memory" colors in the image. Prior attempts to process the video inputs with one-dimensional color processing and color matrices for such extended brightness, contrast or color gamut displays, have resulted in unsatisfactory and unrealistic displayed images and high rates of product return by consumers.

Current projectors, televisions or displays that attempt to enhance or improve perceived color quality with processing that is in any way different than exact colorimetric color reproduction, do not preserve memory colors in the background. A memory color may be characterized as a localized volume in a color space, as will be described subsequently herein. The algorithms used in current image displays, televisions and projectors cannot uniquely preserve a volume within a three-dimensional color space while changing a different volume within the same three-dimensional color space using one dimensional tables, or matrices, or enhancements which are applied to all colors in the 3D space. For example, in some image projectors, color enhancement is attempted using output color definitions of the seven input colors RGBCMYW (red-green-blue-cyan-magenta-yellow-white). This may allow one to provide a bright white in an image without changing red, for example, but it does not allow one to specify any point or localized volume of a memory color in a 3D color space, which is required to preserve that memory color. As a result, when current image displays, televisions and projectors provide enhanced colors, they do so across the entire color gamut, "enhancing" certain memory colors such as flesh tones such that a typical human observer finds them unsatisfactory and not perceptually optimal. In such image devices, the color enhancement is somewhat arbitrary; it does not preserve memory colors, nor produce a perceived display image that is realistic for a better viewing environment.

More generally, to the best of the applicants' knowledge, no one has implemented the use of three dimensional color tables in 3D color processing to improve image quality for video images, or in 3D color processing for gamut mapping to larger color gamut displays than a particular image standard, or in gamut mapping to smaller color gamut displays than a particular image standard, or in 3D color mapping to displays with secondary color capability and more than three colors that are primary or secondary, using visual models of the human visual system or otherwise. Currently, standard color processing for displays uses one dimensional tables, 3×3 matrices or matrix mathematics that allows output definition of a small number of colors like RGBCYMW.

3D color tables have been implemented for color calibration, but in such circumstances, the tables are small (e.g., 7×7×7). These 3D look-up-tables are used instead of one dimensional tables and 3×3 matrices because the small 3D look-up-tables are generally faster, albeit at the expense of some loss of precision. In any case, significant color improvement or enhancements to deliver color "looks," or gamut mapping or mapping to displays with secondary or more than three primary colors with such small tables is not possible.

Another problem in certain types of image rendering devices is that the outputs of the primary color light sources are not stable. This is particularly true for image rendering devices that use organic light emitting diodes (OLEDs) as the sources of the primary colors red, green, and blue. A known problem with OLED displays is that the blue OLED typically has had a considerably shorter lifespan than the red and green OLEDs. One measure of OLED life is the decrease of luminance to half the value of original brightness. The luminance of currently available blue OLEDs decreases to half brightness in a much shorter time than the red or green OLEDs. During the operation of an OLED display, this differential color change between the blue OLED and the red and green OLEDs changes the color balance of the display. This change is much more objectionable to a viewer than a decrease in overall brightness of the display.

To the best of the applicants' knowledge, the problem of managing the overall lifespan of OLED displays has not be solved adequately, which has led to significant delays in product introduction in the marketplace. There is therefore a need to provide a solution that manages the overall quality and lifespan of the relative luminances of the red, green and blue OLEDs in a display device.

Another problem in certain types of image rendering devices is that the battery life of the device is not sufficient to satisfy users' needs. As advances have occurred in wireless communication technology, consumers are spending increasing amounts of time using such devices, while also demanding increased quality in the color images that they display. Mobile displays are being used increasingly for all types of entertainment media including long form media such as television and movies. These uses occur in diverse lighting environments, and the usage lifetime is a critical characteristic to consumers. In a typical hand-held device, both the increase in the duty cycle and the demand for maximum perceived image quality of the display have placed a heavy burden on the batteries used to power such devices.

Consumers are often finding that the battery life of a particular device is less than stated in sales literature and/or owner's manuals. The also find that they cannot use their devices as often as they would like (in some cases nearly continuously over the course of a day), without carrying some sort of a charging cord and plug that connects to a 12 volt automobile jack, a 120 VAC outlet, or a USB port. This is a significant annoyance, and device makers recognize the overall problem.

One solution would be to increase the overall size of the batteries in the device. However, this is clearly unsatisfactory, because space within any of these devices is at a premium, and manufacturers are unwilling to allocate additional volume to batteries when it is needed for many other purposes of equal or greater priority.

Another measure to increase battery life is to reduce the power delivered to the image display, which may be a plasma display, a liquid crystal display (LCD), or an organic light emitting diode (OLED) display. This generally results in a reduction in the brightness of the display, which is also unsatisfactory to consumers, particularly when viewing the display in full daylight. Their expectations of image quality are continuously being raised. For example, a recent iPad® product of Apple launched in March 2012 offers "breakthrough technology" in its display, as set forth at http://www.apple.com/ipad/features/: "The Retina display on the new iPad features a 2048-by-1536 resolution, 44 percent greater color saturation, and an astounding 3.1 million pixels—in the same 9.7-inch space. That's four times the number of pixels in iPad 2 and a million more than an HDTV." In general, the newest, most desirable image displays on the market are typically demanding more battery power, rather than less.

Consumers are unwilling to trade battery life for image quality. There continues to be an increasing need for color display devices that can provide the highest of image quality while also providing sufficiently long battery life to meet consumer demands. Products which can meet this need will have a significant competitive advantage in the marketplace.

SUMMARY

A color-enhanced image display, television, or projection that maintains certain known colors and optimizes colorfulness and contrast will have the highest visual perceptual quality if and only if the rendering is accomplished wherein the input RGB colors are processed inter-dependently. This requires the use of a three-dimensional color look-up table, also referred to herein as a 3D LUT. The color enhancement may entail increased brightness and/or a larger or smaller color gamut, depending upon the particular image display or projector. In prior art image displays and projectors in which traditional matrices and one dimensional color tables operate independently on the RGB input colors, a brighter display is not possible without affecting hue. For example, blue skies will be shifted towards purple, flesh tones will be altered in unpredictable ways, and many other color artifacts may be present, depending upon the content of the particular displayed/projected image. The use of 3D color look-up tables enables brighter, higher contrast, and more colorful image displays and projections without color artifacts. Using methods of the present invention, this can be accomplished for image displays or projectors which have color gamuts about the same as that of a given color standard, or larger than the standard, or smaller than the standard. The color rendering of such image displays or projectors can be enhanced using three dimensional tables with differing methods in each volume and with visual models.

In one aspect of the invention, a first method of producing a color image is provided comprising providing input image data from an image source such as a camera; generating an at least three-dimensional look-up table of values of input colors and output colors, wherein the values in the lookup table convert the input image color data to output image color data in an image rendering unit; loading the at least three-dimensional look-up table into an image color rendering controller; loading the input image data into the imaging color rendering controller; processing the input image data through the at least three-dimensional look-up table to produce output color values stored at the addresses in the at least three-dimensional look-up table; and outputting the output color values to the image rendering unit to produce an output image that is perceived to have at least one of enhanced brightness, enhanced contrast, and enhanced colorfulness compared to the input image.

The values in the lookup table may be calculated based upon a visual model of the human visual system and they may include modeling to improve the perceived brightness or contrast or colorfulness for different viewing environments. The at least one of enhanced brightness, enhanced contrast, or enhanced colorfulness introduced by the at least three dimensional look-up-table may produce a chosen artistic perception in the output image. The image rendering unit may have an expanded color gamut greater than the color gamut of the input image data, wherein the output colors to the image rendering unit utilize the expanded color gamut, or the image rendering unit may have a reduced color gamut smaller than the color gamut of the input image data, wherein the output colors to the image rendering unit utilize the smaller color gamut. The input image data may contain memory colors and non-memory colors, and the method may include identifying the memory colors in the input image data to be substantially maintained, characterizing the memory colors and non-memory colors with respect to their chromaticities, and producing an image with substantially maintained memory colors using the image rendering unit. In such circumstances, the perceived colorfulness, brightness, and contrast of the non-memory colors are changed differently than perceived colorfulness, brightness, and contrast of the memory colors. They may be increased more than perceived colorfulness, brightness, and contrast of the memory colors. In one embodiment, the perceived colorfulness, brightness, and contrast of the non-memory colors are increased more than perceived colorfulness, brightness, and contrast of the memory colors. Generating the at least three-dimensional look-up table may include computing enhanced lightness, chroma, and hue for the memory colors using a non-linear enhancement function. The enhancement function may be a sigmoidal function. More than one at least three-dimensional look-up table for the color transformation of the non-memory colors and the memory colors may be generated and used. Each of the at least three dimensional look-up tables may be optimized for a different viewing environment of the image rendering unit. The method may further include providing a sensor for measuring the ambient light in the viewing environment.

The input image data may be of a first color standard, and the method may further include converting the input image data of the first input color standard into an input color specification for inputting into the three-dimensional look-up table. The at least three-dimensional look-up table may have at least three input colors and/or at least three output colors. The at least three output colors may be any combination of primary colors as independent light sources or secondary colors defined as combinations of primary colors. The at least three dimensional look-up table may be losslessly compressed to reduce storage use in memory of the image color rendering controller. The method may further include calibrating the image rendering unit by measuring the color response of the image rendering unit, and then modifying the output image data either by additional processing after the at least three-dimensional look-up-table or by including the required calibration in the at least three-dimensional look-up-table.

The image color rendering controller may be contained within the image rendering unit, or it may be external to the image rendering unit. An auxiliary imaging device controller may be in communication with the image color rendering controller and the image rendering unit. The image rendering unit may be selected from, but not limited to a projector, a television, a computer display, and a game display, and may use DMD, plasma, liquid crystal, liquid crystal-on-silicon modulation, or direct modulation of the light source. The light source may be an LED, OLED, laser, or lamp light sources. Without limitation, the image color rendering controller may be in communication with at least one of a cable TV set-top box, a video game console, a personal computer, a computer graphics card, a DVD player, a Blu-ray player, a broadcast station, an antenna, a satellite, a broadcast receiver and processor, and a digital cinema.

The image rendering unit may include an algorithm for color modification, wherein the at least three-dimensional look-up table further comprises processing the input image data to compensate for the color modification performed by the image rendering unit. The image rendering unit may include an algorithm for creating secondary colors from primary colors, and the at least three-dimensional look-up table further comprises compensating for the color modification performed by the addition of the secondary colors in the image rendering unit.

The at least three-dimensional look-up table may further include processing the input image data to increase perceived color, brightness, and contrast to compensate for the reduction in perceived color, brightness, and contrast caused by the algorithm for color modification in the image rendering unit. The at least three-dimensional look-up table may contain a transformation from a suboptimal viewing environment to an improved viewing environment including the visual adaptation of the human visual system. The at least three-dimensional look-up table may include the definition of secondary colors, and may further contain enhanced lightness, chroma, and hues to increase perceived colorfulness, contrast, or brightness to compensate for the loss in perceived colorfulness, contrast, or brightness due to addition of the secondary colors by the image rendering unit. The at least three-dimensional look-up table may further include processing the input image data to include chromatic adaptation of the human visual system to a specified white point that increases the brightness of the image rendering unit.

The instant method may be used in the display or projection of two dimensional (2D) or "three dimensional" (3D) images. The 3D images are typically produced by providing 2D stereo images simultaneously or in rapid sequence taken from two perspectives, so as to provide the observer with the illusion of depth perception. The image rendering unit may be a "3D" unit. By way of illustration, and not limitation, the unit may be e.g., an autostereoscopic display, or it may include a polarizing filter to separate the 2D stereo images being projected and directed to the eyes of an observer using polarization glasses, or it may include a shuttering mechanism to separate the 2D stereo images being projected and directed to the eyes of an observer using time synced shutter glasses. In any case, both sets of 2D images may be processed according to the instant method to deliver 3D images that are perceived by an observer to have enhanced brightness, and/or enhanced contrast, and/or enhanced colorfulness.

In another aspect of the invention, an additional method of producing a color image is provided, the method comprising providing input image data of a first color gamut and an image rendering unit of a second, expanded or reduced color gamut; generating an at least three-dimensional look-up table of values of input colors and output colors, wherein the values in the lookup table expand or reduce the input image data to encompass the second color gamut of the image rendering unit; loading the at least three-dimensional look-up table into an image color rendering controller; loading the input image data into the imaging color rendering controller; processing the input image data through the at least three-dimensional look-up table using the input image data as addresses into the at least three-dimensional look-up table to produce output image data from the output color values stored at the addresses in the at least three-dimensional look-up table; and outputting the output image data to the image rendering unit to produce an output image that is perceived to have at least one of enhanced brightness, enhanced contrast, and enhanced colorfulness compared to the input image. This method may also include the various aspects and/or steps described above for the first method.

In another aspect of the invention, the models may include visual models of HVS perceptual adaptation to produce a projected or displayed image that appears as it would in a more optimal, well lit viewing environment. The image processing may include correcting for low level lighting of the surrounding environment and/or indoor or outdoor ambient light added to the displayed image. More specifically, a method of producing a color image by an image rendering unit in a sub-optimal viewing environment is provided, the method comprising generating an at least three-dimensional look-up table of values of input colors and output colors, the table containing a transformation from a suboptimal viewing environment to an improved viewing environment; loading the at least three-dimensional look-up table into an image color rendering controller; loading the input image data into the image color rendering controller; processing the input image data through the at least three-dimensional look-up table using the input image data as addresses into the at least three-dimensional look-up table to produce output image data from the output color values stored at the addresses in the at least three-dimensional look-up table; and outputting the output image data to the image rendering unit. This method may further include the various aspects and/or steps described above for the first method. The improved viewing environment may be such that an observer may perceive the color image to have more color, contrast, or brightness.

In yet another aspect of the invention, a method of producing a color image by an image rendering unit is provided, the method comprising generating an at least three-dimensional look-up table of values of input colors and output colors, the three-dimensional look-up table containing the definition of secondary colors or more than three primary colors; loading the at least three-dimensional look-up table into an image color rendering controller; loading the input image data into the image color rendering controller; processing the input image data through the at least three-dimensional look-up table using the input image data as addresses into the at least three-dimensional look-up table to produce output image data from the output color values stored at the addresses in the at least three-dimensional look-up table; and outputting the output image data to the image rendering unit to produce an output image that is perceived to have at least one of enhanced brightness, enhanced contrast, and enhanced colorfulness compared to the input image. This method may also include the various aspects and/or steps described above for the first method.

The secondary colors or more than three primary colors may be explicitly defined, or the secondary colors or more than three primary colors implied in the design of a three in by three out look-up table for two conditions. In either instance, measured responses of the image rendering unit may be used to define the three-dimensional look-up table, or mathematics provided by a manufacturer of the image rendering unit may be used to define the three-dimensional look-up table. Alternatively, an open definition of how the secondary colors or more than three primary colors are used may be provided. This method may also include the various aspects and/or steps described above for the first method.

In another aspect of the invention, the problem of displaying or projecting an image that is optimal in human visual perceptual terms regardless of the ambient light and background environment of the image is solved by using visual models to enhance the perceived colorfulness, contrast, or brightness of the image, thereby improving the perceived quality of the image. The visual models of human visual perception may be used to create look-up tables of at least three dimensions to process the image to be displayed. Memory colors of the image may be preserved. The method may further include performing empirical visual studies to determine the dependence of the preference of colorfulness, contrast, or brightness on the ethnicities of the human observers, and defining the perceived quality of the image for each nationality of human observers. The method may further include adjusting the colorfulness, contrast, or brightness of the image based upon one of the ethnicities of the human observers. The method may further include generating an at least three-dimensional look-up table of values of input colors and output colors, the three-dimensional look-up table adjusting the colorfulness, contrast, or brightness of the image to match the enhanced appearance of analog film systems or digital systems designed for cinemas. The method may further include adjusting the colorfulness, contrast, or brightness of the image to produce a chosen artistic perception in the image.

In another aspect of the invention, a method of producing a color image by an OLED display is provided that manages the overall quality and lifespan of the relative luminances of the red, green and blue OLEDs in the display. The method comprises providing input image data and providing the OLED display having at least three OLEDs, each OLED being of a different primary color; generating an at least three-dimensional look-up table of values of input colors and output colors, wherein the values in the lookup table convert the input image data to output image color data of the OLED display in a manner that optimally manages the quality of the image and the lifetime of the at least three OLEDs; loading the at least three-dimensional look-up table into an image color rendering controller; loading the input image data into the imaging color rendering controller; processing the input image data through the at least three-dimensional look-up table to produce output color values stored at the addresses in the at least three-dimensional look-up table; and outputting the output image data to produce the image by the OLED display. The values in the look-up table may be calculated based upon a visual model of the human visual system. This method may further include the various aspects and/or steps described above for the first method.

The at least three OLEDs may be a red OLED, a green OLED, and a blue OLED. In such an instance, managing the quality of the image and the lifetime of the OLEDs may further include adding a white primary and mapping predetermined amounts of the grey component of RGB pixel values to the white primary to reduce the usage of RGB and extend the life of the red, green, and blue OLEDS. Alternatively, managing the quality of the image and the lifetime of the OLEDs may comprise adding other primary colors and mapping predetermined amounts of the RGB pixel values to the other primary colors to reduce the usage of RGB and extend the life of the red, green, and blue OLEDS. The method may further comprise operating the at least three OLEDs such that a first OLED does not reach end of life sooner than the other OLEDs, and the image quality of each of the OLEDs is reduced about equally over time without perceived artifacts or appearances predominantly of one of the OLED colors.

The method may be further comprised of having a controlled degradation of image quality due to changes in the outputs of at least one of the OLEDs, wherein the change of quality at any given point in time has the least loss in perceived quality. The controlled degradation may be tracked by accumulating and using usage data for all of the OLEDs. The controlled degradation may be performed on the entire image over time, or on at least one portion of the image over time. The controlled degradation may be performed by substantially maintaining the brightness of the image while gradually reducing color saturation of the image over time, or by reducing color saturation of the image to a greater extent in image pixels of low color saturation than in image pixels of high color saturation, or by substantially maintaining the brightness of the image while reducing color saturation gradually using adaptive one dimensional tables on each of the primary colors.

The one dimensional tables on each primary color may be calculated using a quality degradation model. The quality degradation model may average among one dimensional tables that are pre-designed to provide the targeted image quality at specific OLED lifetimes. The one dimensional tables may be produced by interpolation between a one dimensional table for when the OLEDs are initially operated and a one dimensional table for when the OLEDs are at the ends of their useful lifetimes.

In another aspect of the invention, in an image display, television, or projector, the problem of achieving an expanded or maximum color gamut by temporally combining R, G, and B during an image frame duty cycle to increase brightness while maintaining saturated pure R, G, and B colors is solved by calculating the combinations of R, G, and B that maintain a physical or perceived input color in a given viewing environment thereby maintaining physical or perceived color saturation and achieving increased brightness. The calculated combinations are implemented in a 3D look-up table.

In any of the above aspects of the invention, the color image to be produced may contain "memory colors" as defined herein, and non-memory colors. In general, the memory colors of the image that is produced are preserved. The methods may include identifying the memory colors in the input image data to be substantially maintained, characterizing the memory colors and non-memory colors with respect to their chromaticities in the image rendering unit, and producing an image comprising human visual system perceptually accurate memory colors using the image rendering unit. The perceived colorfulness, brightness and contrast of the non-memory colors are increased more than perceived brightness and contrast of the memory colors. In one embodiment, generating the at least three-dimensional look-up table may include computing enhanced lightness, chroma, and hue for the memory colors using a sigmoidal enhancement function. More than one at least three-dimensional look-up table may be generated for the color transformation of the non-memory colors and the memory colors. Some or all of the at least three dimensional look-up tables may be optimized for a different viewing environment of the image rendering unit. In such an instance, the method may further include selecting one of the at least three-dimensional look-up tables for loading into the image color rendering controller based upon the viewing environment of the image rendering unit. A sensor may be provided for measuring the ambient light in the viewing environment.

In a related aspect of the invention, the problem of displaying an image that simultaneously has high brightness and high colorfulness of a majority of colors (and particularly high saturation colors), while maintaining realistic "memory colors" is solved by adding white light or any combination of multiple R, G, B colors by combining R, G, and B for some portion of the duty cycle of the image projection time, according to a 3D look-up table, which replaces the lost colorfulness of adding color combinations and at the same time preserves flesh tones and other known memory colors. The image data is processed with a 3D look-up table in a manner that that increases the perceived colorfulness, brightness, and contrast while preserving flesh tones and other known memory colors. The 3D look-up table is created to produce the improved image quality. Visual models may be used to perform the image processing.

In any of the above aspects of the invention, the methods may further comprise converting the input image data of a first input color standard into an input color specification for inputting into the three-dimensional look-up table.

The solutions to the above problems may entail multi-dimensional look-up tables, with three dimensional look-up tables being one example. The at least three dimensional lookup table may have three or more input colors and three or more output colors. The output dimension may be different from the input dimension, such as having RGB-CYMW (red-green-blue-cyan-magenta-yellow-white) output values in an RGB table, i.e. three values of input and seven values of output. The number of outputs may also be greater than three due to the display having more than three physical colors, i.e., more than three primary colors such as R, G, and B. In such an instance, the output colors could therefore be the primary colors or combinations of the four or more colors. In general, the three or more than three output colors are any combination of primary colors as independent light sources or secondary colors defined as combinations of primary colors. The at least three dimensional look-up table(s) may be losslessly compressed to reduce storage use in a memory of the image color rendering controller.

More specifically, according to the present disclosure, a method of displaying an image containing memory colors and saturated colors is provided comprising identifying the memory colors in input image data to be substantially maintained, characterizing the memory colors with respect to their chromaticities, and generating a three-dimensional look-up table for a color transformation of saturated and memory colors. The three-dimensional look-up table is loaded into an imaging device controller, and input image data is loaded into the imaging device controller. The input image data is processed with an algorithm using the three-dimensional look-up table to produce output image data. The output image data is output to an image rendering device, and a high brightness, high contrast image comprising human visual system perceptually accurate memory colors is displayed or projected.

In one embodiment, the method includes preprocessing, wherein one dimensional tables and matrices are provided for converting the variety of possible input color standards into a preferred color input to the 3D or higher dimensional color look-up-table. This is done for the purpose of making a single or reduced number of 3D or higher dimensional color look-up-tables adaptable to different video standards. In another embodiment, the algorithm containing the 3D or higher dimensional mathematics is executed in real time by the central processing unit of a computer in the image display or projection device so that the need for a 3D color table is obviated. This may be done if the device computer is provided with adequate computational processing capability and memory.

In another embodiment, the method includes incorporating the variety of possible input color standards directly into the creation of the 3D or higher dimensional color look-up-tables to adapt to different video standards.

In some circumstances, the image rendering unit (such as, e.g., a display or projection device) is provided with some color modification capability that is "built in." For example, the device may provided with an algorithm to add white or secondary colors, resulting in a loss of colorfulness, and a distortion in the appearance of memory colors. In such circumstances, the output values in the at least three-dimensional look-up table are determined such that the input image data is processed to compensate for the color modification performed by the image rendering unit. The method may thus include providing at least 3D color tables to adjust the color data in a manner that shifts it in a direction within the color space that compensates for the built in color modification that is performed by the image rendering unit. The at least three-dimensional look-up table further comprises processing the input image data to increase perceived color, brightness, and contrast to compensate for the reduction in perceived color, brightness, and contrast caused by the algorithm for color modification in the image rendering unit. In a more specific instance in which the image rendering unit includes an algorithm for creating secondary colors from primary colors, the at least three-dimensional look-up table may further comprise compensating for the color modification performed by the addition of the secondary colors in the image rendering unit. The values in the at least three dimensional lookup table may also be determined such that the at least three-dimensional look-up table further comprises processing the input image data to include chromatic adaptation of the human visual system to a specified white point that increases the brightness of the image rendering unit. The at least three-dimensional look-up table may also adjust the colorfulness, contrast, or brightness of the image to be produced to match the enhanced appearance of analog film systems or digital systems designed for cinemas.

According to the present disclosure, there is further provided a device for producing a color image. The device is comprised of a computer including a central processing unit and a memory in communication through a system bus. The memory may be a random access memory, or a computer readable storage medium. The memory contains an at least three dimensional lookup table.

In one aspect of the invention, the at least three dimensional lookup table contains values of input colors and output colors, wherein the values in the lookup table convert an input image color data set to output image color data in an image rendering unit that is connectable to the device.

In another aspect of the invention, the at least three dimensional lookup table may be produced by an algorithm for transforming input image data comprising memory colors and non-memory colors to a visual color space, and computing enhanced lightness, chroma, and hue for the memory colors and non-memory colors in the visual color space. The algorithm to produce the three dimensional lookup table may be contained in the memory.

In another aspect of the invention, the at least three dimensional lookup table includes values of input colors and output colors, wherein the values in the lookup table convert a first color gamut of an input image data set to encompass a second expanded or reduced color gamut of an image rendering unit that is connectable to the device.

In another aspect of the invention, the at least three dimensional lookup table contains a transformation from a suboptimal viewing environment to an improved viewing environment including the visual and chromatic adaptation of the human visual system.

In another aspect of the invention, the at least three dimensional lookup table contains the definition of secondary colors, and enhanced lightness, chroma, and hues to increase perceived colorfulness, contrast, or brightness to compensate for the loss in perceived colorfulness, contrast, or brightness due to addition of secondary colors by an image rendering unit that is connectable to the device.

In another aspect of the invention wherein the image is perceived by a human observer, the memory may contain a visual model to enhance the perceived colorfulness, contrast, or brightness of the image.

In any of the above aspects of the invention, the device may further include the image rendering unit in communication with the computer. The image rendering unit may be selected from a projector, a television, a computer display, and a game display, and may use DMD, plasma, liquid crystal, liquid crystal-on-silicon modulation (LCOS), or direct modulation of the light source and LED, organic light emitting diode (OLED), laser, or lamp light sources. The device may further comprise an auxiliary imaging device including at least one of a cable TV set-top box, a video game console, a personal computer, a computer graphics card, a DVD player, a Blu-ray player, a broadcast station, an antenna, a satellite, a broadcast receiver and processor, and a digital cinema. One of a liquid crystal display, a plasma display, and a DMD projector may be in communication with the auxiliary device. The device may further comprise a communication link to a source of input image data.

The at least three-dimensional look-up table includes the definition of secondary colors, and contains enhanced lightness, chroma, and hues to increase perceived colorfulness, contrast, or brightness to compensate for the loss in perceived colorfulness, contrast, or brightness due to addition of the secondary colors by the image rendering unit. Alternatively or additionally, the at least three-dimensional look-up table may contain a transformation from a suboptimal viewing environment to an improved viewing environment including the visual and chromatic adaptation of the human visual system.

The memory of the device may contain a set of at least three dimensional lookup tables; each table of the set may be optimized for a different viewing environment of the image rendering unit. The device may be provided with a sensor for measuring the ambient light in the viewing environment.

In another aspect of the invention, a method is provided for displaying a high quality color image while reducing power consumption of the display. The display may include a display screen, or the display may project the image onto a surface. The method may include providing different amounts of added white or brightness to each pixel as a function of the input pixel color value. Pixels with higher color saturation may have smaller amounts of white added so that the input color saturation is better preserved, and pixels that are more neutral grey can have more white added to increase the brightness more for black-white pixels. This allows the input color saturation to be maintained to a high degree, and thus the colorfulness (and thus the image quality) perceived by an observer to be maintained. Additionally, if the amount of added white is reduced to a negligible amount for the highest input color saturation, the full input color gamut of the display can be maintained.

Various methods of reducing the added white with increasing color saturation are contemplated. For example, a Gaussian function of the input color saturation may be used that has a one sigma (one standard deviation) width that is smaller than the full input color gamut. This method of adaptively adding white to a pixel results in the added brightness and corresponding power savings to be dependent on the image. For images that are more black-white, and thus low in color saturation, the power savings will be highest, and for highly colorful images, the power savings will be the lowest. This type of processing may be implemented in real time on image data so the image-dependent power savings may thus change from image to image. This method is in accordance with the color processing of this invention, because the loss in color saturation is in the mid-range of image color saturation and the color processing of this invention has the highest color saturation restoration in this range of input color saturation. Additionally, because most images have low-to-medium color saturation, and because the power savings is greater for those types of image pixels, the resulting average power savings for a given set of image (such as a movie or video) is close to the maximum power savings for black-white images.

In another aspect of the invention, the problem of displaying high quality images on a portable display device over an extended period of time is solved by modifying the primary colors of the display device such that the resulting new primary colors are more efficient. This enables power to the device to be reduced, such as by using a lower power light source (for a liquid crystal display), or by using a lower power lamp or lower power white OLEDs. This results in less heat production and less other display management costs.

However, such a modification to the primary colors will change the color gamut of the display, including its white point. Without corrective action, this can result in colors being rendered by the display that are unsatisfactory to the viewer. In a further aspect of the invention, this problem is solved by the use of the Applicants' three-dimensional color look-up tables (3DLUTs), which correct the colors to those that are aesthetically pleasing.

Thus the combination of modifying the primary colors of the display device such that the resulting new primary colors are more efficient, and correcting the resulting shift in color gamut by the use of three-dimensional color look-up tables solves the problem of displaying high quality images on a portable display over an extended period of time. By lowering power consumption, battery life of the portable display is increased.

In accordance with the invention, there are multiple options for solving this overall problem. According to one aspect of the invention, there is provided a method of producing a color image using a display comprised of pixels comprising red, green and blue primary color subpixels. The method comprises reducing the color gamut and increasing the brightness of the image relative to a base level, decreasing power to the display to reduce the brightness of the image, restoring color to the image to approximately the base level by modifying image pixel data using a three-dimensional lookup table to produce output image pixel data, and communicating the output image pixel data to the display to produce the color image. The display may be one of an LCD display, an LED display, an OLED display, a plasma display, and a DMD projector.

Reducing the color gamut and increasing the brightness of the image may be accomplished by adding white to the image. White may be added by adding a white subpixel to each pixel of the image, or by adding white to at least one of the primary color subpixels of each pixel of the image. White may be added to two or all three of the primary color subpixels. The white may be added to the primary color subpixels in unequal amounts.

In certain embodiments, the white may be added adaptively according to an algorithm by which the amount of white added decreases with increasing color saturation. A Gaussian function may be used in the algorithm to define the decrease in white with increasing color saturation. The algorithm may be used to determine the values in the three-dimensional lookup table.

A plurality of images may be produced using the display, wherein the algorithm includes determining the amount of white to add to each image pixel and the amount of the decrease in power for each image. The algorithm may include determining the amount of white added for each individual pixel, and additionally, for each individual red, green and blue primary color subpixel. The white may be added to the subpixels during a portion of a pixel exposure time.

The white may be added from a second source that is separate from a first source that provides the red, green and blue primary color subpixels. In embodiments wherein the display is an LCD display, a first backlight may be the first source, and a second backlight may be the second source. Alternatively, the white may be added to each pixel by a white subpixel.

In certain embodiments, the decreasing power to the display reduces the brightness of the image to approximately the base level. In other embodiments, decreasing the power to the display reduces the brightness of the image to a level brighter than the base level, i.e., some power reduction to the display is achieved while also providing a brighter display.

In certain embodiments, restoring the color of the image is performed in the IPT color space. The values in the three-dimensional look-up table may be determined by using a visual model of the human visual system, which may include a model of chromatic adaptation of the human visual system. Restoring the color of the image may include correcting the white point of the display to a white point of a color standard.

In certain embodiments, memory colors are preserved in the color image.

BRIEF DESCRIPTION OF THE DRAWINGS

The patent or application file contains at least one photograph rendered in color. Copies of this patent or patent application publication with color photographs will be provided by the Office upon request and payment of the necessary fee. A Petition for the acceptance of color photographs is being filed under 37 C.F.R. 1.84(b)(2) concurrently with this application.

The present disclosure will be provided with reference to the following drawings, in which like numerals refer to like elements, and in which.

Figure 1A:
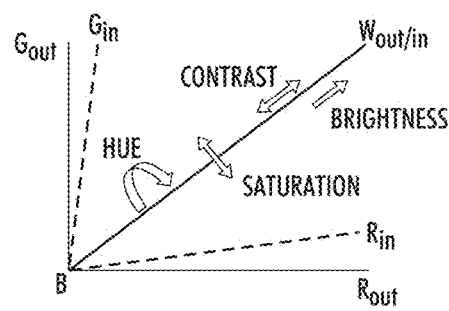
FIGS. 1A-1D are illustrative, two-dimensional schematic diagrams of various prior art ways for processing input color data to produce output color data for rendering a color image.
Figure 1B:
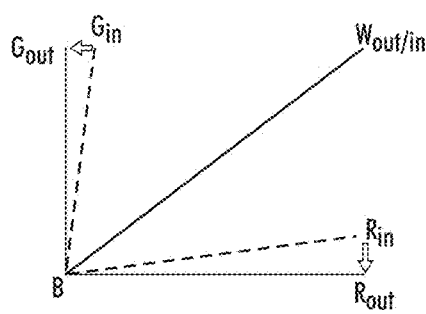
Figure 1C:
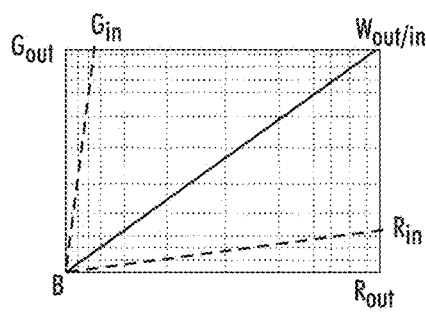
Figure 1D:
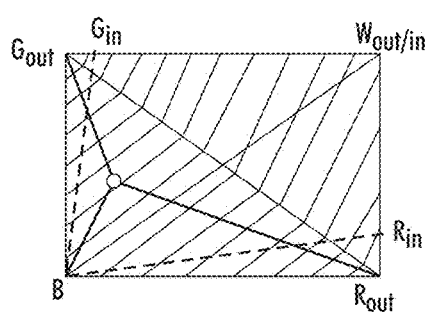

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements. In describing the present invention, a variety of terms are used in the description. Standard terminology is widely used in image processing, display, and projection arts. For example, one may refer to the International Lighting Vocabulary, Commission Internationale de l'éclairage (CIE), 1987 for definitions of standard terms in the fields of color science and imaging. One may also refer to Billmeyer and Saltzman's PRINCIPLES OF COLOR TECHNOLOGY, $3^{RD}$ Ed, Roy S. Berns, John Wiley & Sons, Inc., 2000; and Color Appearance Models, Mark D. Fairchild, Wiley-IS&T, Chichester, UK (2005).

In order to fully describe the invention, as used in the present disclosure, certain terms are defined as follows:

Brightness—attribute of a visual perception according to which an area appears to emit, or reflect, more or less light.

BT.709—abbreviated reference to ITU Radiocommunication Sector (ITU-R) Recommendation BT.709, a standard for the format of high-definition television.

Figure 3:
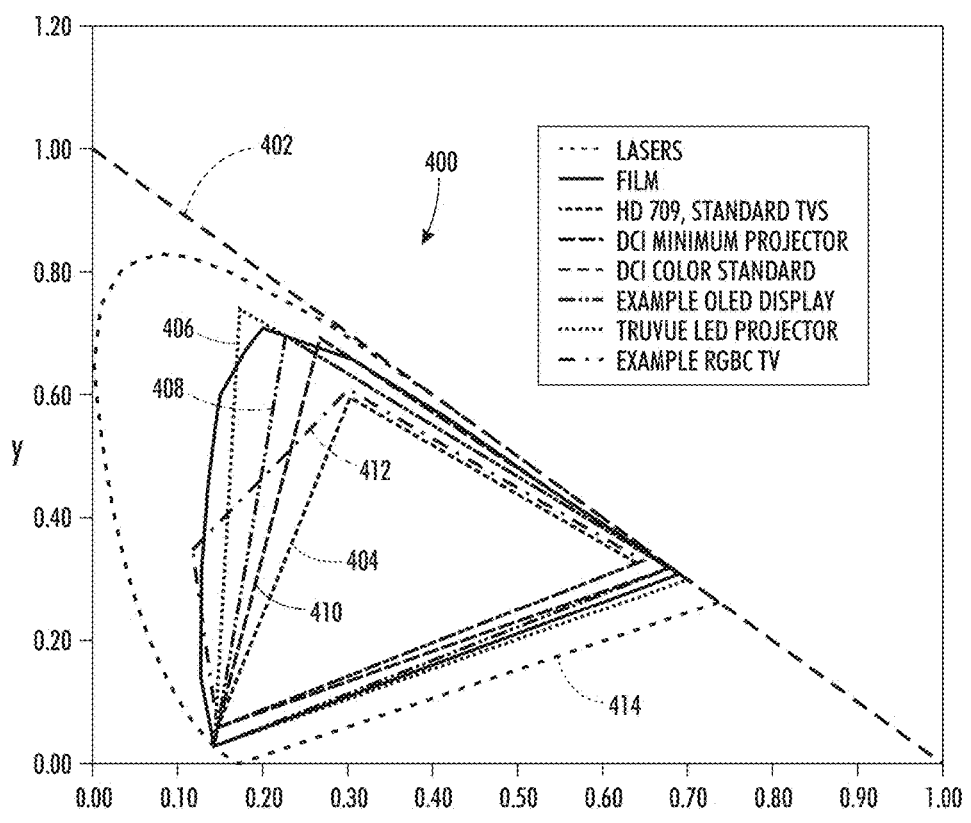
FIG. 3 is a chromaticity diagram that depicts color gamuts of the DCI and HD709 standards, and color gamuts of various media and/or imaging devices.

Chromaticity—normalized CIE Tristimulus values often used to visualize the color gamuts of devices in a Chromaticity diagram, such as that shown in FIG. 3.

CIECAM02—the most recent color model adopted by the International Commission on Illumination, or Commission internationale de l'éclairage (CIE), published in 2002.

Color—A specification of a color stimulus in terms of operationally defined values, such as three tristimulus values.

Color Space—A three-dimensional space in which each point therein corresponds to a color.

Colorfulness—Attribute of a visual perception according to which the perceived color of an area appears to be more or less chromatic.

Contrast—In the perceptual sense, assessment of the difference in appearance of two or more parts of a field seen simultaneously or successively.

DCI Standard—a color standard for digital cinema systems created by Digital Cinema Initiatives, LLC a joint venture of major motion picture studios formed in 2002. The standard is included in the publication, "Digital Cinema System Specification," Version 1.2 approved by Digital Cinema Initiatives, LLC Mar. 7, 2008.

Display—An imaging device which forms an image from discrete lighted elements at a surface thereof.

Color Gamut—The range of colors producible with a set of inks, lights, or other colorants. A color gamut may be described in terms of a particular region of a color space.

Hue—Attribute of a visual perception according to which an area appears to be similar to one of the colors, red, yellow, green, and blue, or to a combination of adjacent pairs of these colors considered in a closed ring.

Memory color—a color of an object in an image for which an observer may consciously or unconsciously observe and make a judgment as to whether the color of the object is accurate, based upon the observer's memory of previous experiences observing the object. Examples of memory colors are flesh (human skin) tones, the green of grass, the blue of the sky, the yellow of a banana, the red of an apple, and grey scale. The accurate rendering of colors associated with commercial products and registered trademarks, such as "Kodak yellow", "IBM blue," and "John Deere green" may be important to some viewers/users of images, and are also examples of memory colors. It is further noted that the perceived appearance of memory colors may be influenced by the context in which they are seen by an observer.

Primary colors—The colors of the individual light sources, including all color filters, that are used to create a color image in an image rendering unit.

Projector—An imaging device which forms an image by delivering and in some instances focusing light on a distant, separate surface such as a wall or screen.

RGBCYMW—in the use of any of these capital letters in combination herein, they stand for red, green, blue, cyan, yellow, magenta, and white, respectively.

Rendering an image—providing an image for observation, either via an image display that forms an image from discrete lighted elements at a surface thereof, or via an image projector that forms an image by delivering and in some instances focusing light on a distant, separate surface such as a wall or screen.

Saturation—Colorfulness of an area judged in proportion to its brightness.

Secondary colors—Linear or non-linear combinations of the primary colors of an image rendering unit that can be controlled independently from the primary colors.

Tristimulus values—Amounts of the three reference color stimuli, in a given trichromatic system, required to match the color of a stimulus being considered.

White—a set of three values of primary colors, typically red, green, and blue, that may be added to a color in a portion of an image, thereby in effect adding white to the color to brighten the color.

It is further noted that as used herein, a reference to a three dimensional lookup table or a 3DLUT is meant to indicate a table of at least three dimensions, unless otherwise indicated. A lookup table may be multidimensional, i.e., it may have three or more input colors and three or more output colors.

Figure 2:
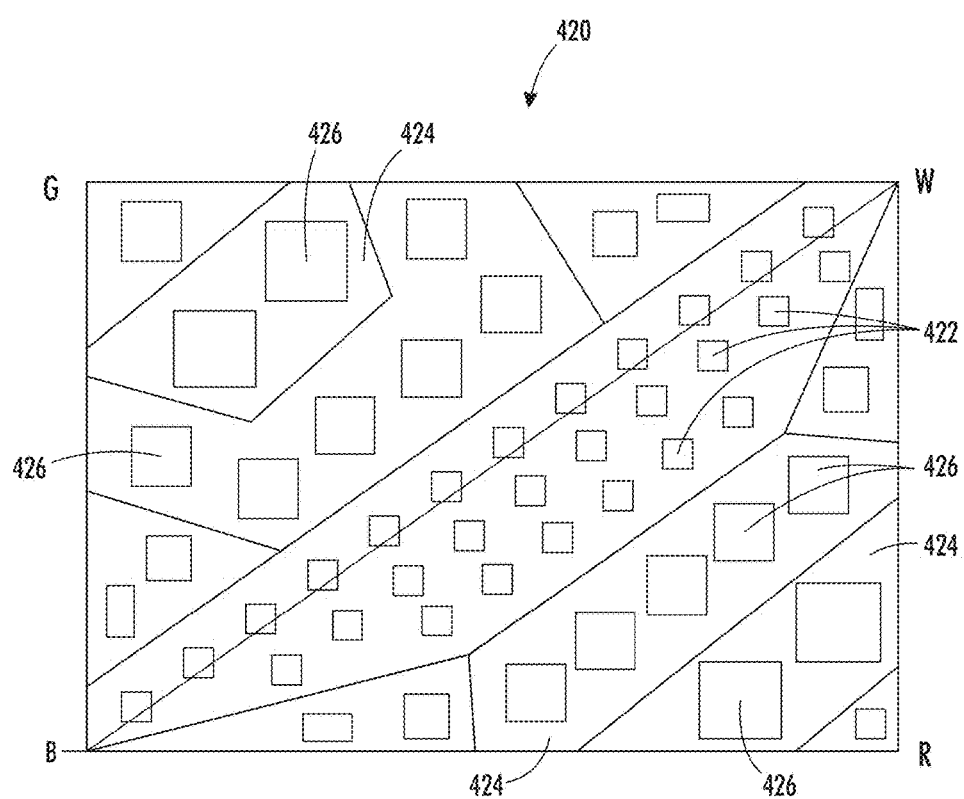
FIG. 2 is a schematic diagram of aspects of the instant method for processing input color data to produce output color data for rendering a color image.

FIG. 2 is an illustrative, two-dimensional schematic diagram depicting the full multi-dimensional capability of an at least three dimensional color table 54 used in processing input color data to produce output color rendering a color image. For the sake of simplicity of illustration, the diagram 420 of FIG. 2 depicts only a 2D rendition of an at least 3D color table 54 of the present invention. Any point, and/or any region in the full color space can be changed independently. The small squares 422 represent locations in the color space in which no change in color is made. These locations may be memory color locations, such as flesh tones.

In other regions 424, selective increases in contrast, colorfulness, and brightness may be made. The larger squares 426 in these regions 424 represent locations where colorfulness, contrast, and brightness are increased. Any local color or color region, such as a flesh tone region, can be chosen for unique color processing. In one embodiment, a 3D color table may contain output values for every input RGB color, which for 12 bits per color would be 4096×4096×4096 independent colors, thereby providing 68.7 billion local color choices. In another embodiment, a 3D color table size can be reduced by using the most-significant bits of the input colors to define the 3D color table locations and performing multi-linear or other multi-dimensional interpolation using the least-significant bits of the input colors.

It is to be understood that the while the squares 422 and 426 are meant to indicate various color regions, the borders of the squares are not meant to indicate sharply defined boundaries of such regions. As described previously, these regions may be modeled using a probability distribution that provides a smooth transition from regions in the color space that are outside of the regions defined by the squares.

For example, the various regions may be defined by Gaussian boundaries that are smoothly connected by probability functions. In defining the color output values in the at least 3D LUT 54, volume derivatives may be used that displace the color (R,G,B) vectors in different amounts. Within memory color regions, the color vectors have a lesser displacement, or possibly none at all, while other color regions have larger displacements to increase their contrast, colorfulness, and brightness.

Figure 5:
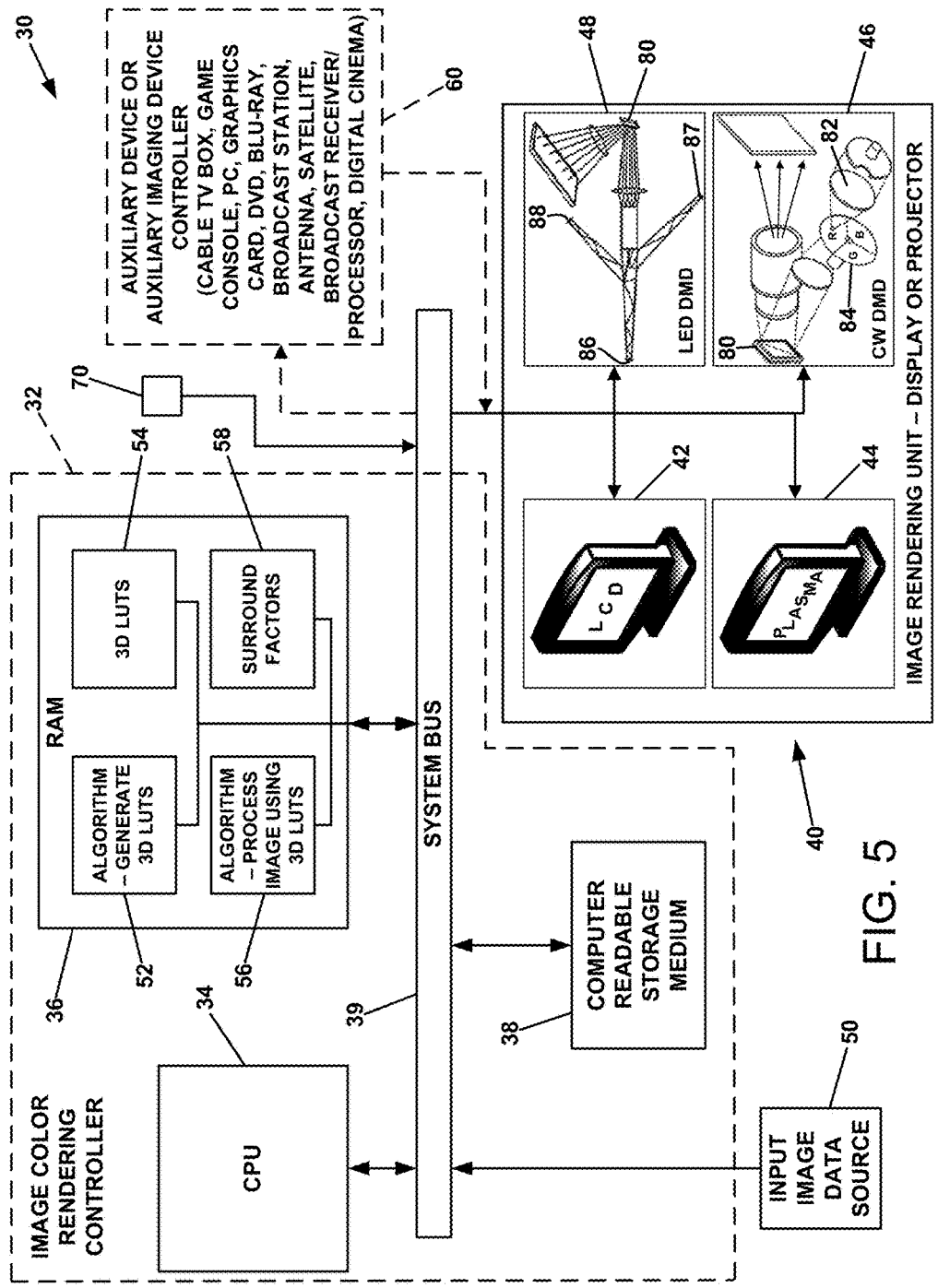
FIG. 5 is a schematic diagram of a device for producing a color image.

The full table may be very large. For example, a large table results if the input color is 24-bit (i.e. 8 bits each for R, G, and B), and the output includes white and is 32 bit (i.e. 8 bits each for R, G, B, and W). Referring to FIG. 5, this large 3D LUT 54 may be used if the memory 36 of the image color rendering controller is sufficiently large, and results in the fastest color processing. However, if the memory 36 is limited in size, but sufficient computational capacity is available in the CPU 34, multi-dimensional interpolation may be used to reduce the size of the 3D LUT 54. In this particular example, for each respective primary input color, bits 3 through 8 may be used to define and address the 3D LUT 54. Multi-dimensional interpolation may then be used with bits 1 and 2 to define the output colors that occur between the output colors associated with the 8 vertices of the cube in the 3D LUT 54 defined by bits 3 through 8.

The color gamut of an image rendering unit, such as a display, television, and/or projector is defined by the maximum colors that can be produced by that image rendering unit with combinations of its primary colors. FIG. 3 shows the color gamuts of various image rendering technologies compared to the CCIR709 color standard 404 and the DCI color standard 402. FIG. 3 shows that displays such as LED projectors (gamut 406), OLED displays (gamut 408), Digital Cinema projectors (gamut 410) and televisions with more than 3 primary colors (gamut 412) have larger color gamuts than the CCIR709 color standard (gamut 404) for digital media distribution, thus illustrating the need to map the smaller CCIR709 color standard to the larger color gamut of these display types. All other international color standards for consumer digital color media are similar to CCIR709 and therefore exhibit the same need to map these standards to the larger color gamut of the display types in FIG. 3. In the methods of the present invention, this is done while simultaneously preserving memory colors, and optimizing the particular device for viewing in a particular environment, and taking into account adaptation of the human visual system. FIG. 3 also shows that the DCI "Hollywood" color standard is significantly larger than the color gamut 414 of an infinite set of lasers, and therefore larger than any possible display or image rendering unit, thus illustrating the need to map the larger input to the smaller color gamut of any display type including a professional digital cinema projector.

Figure 4:
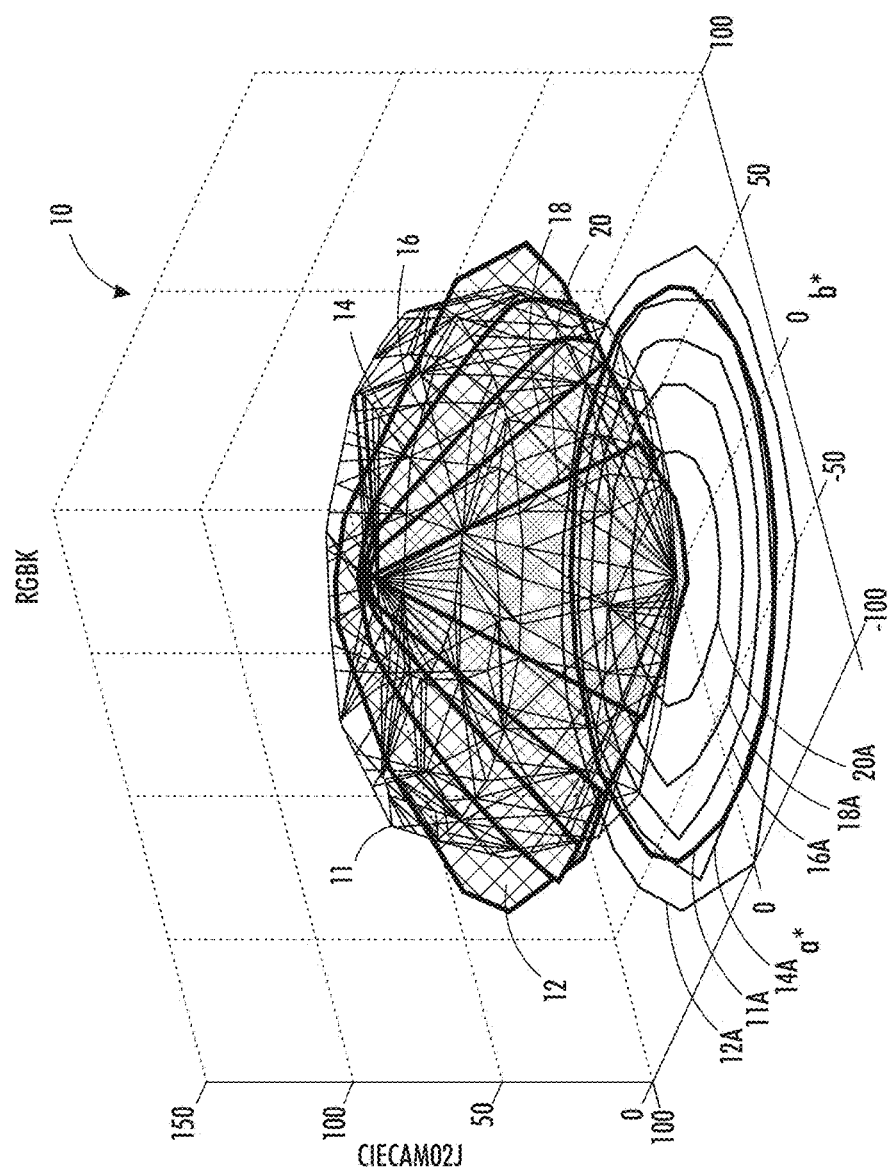
FIG. 4 is a perspective view of a three-dimensional color space depicting a series of color gamuts of an image display, projector, or television in which the gamuts have been sequentially reduced by the addition of white to the R, G, and B primary colors thereof.

In a color image rendering unit, such as a display, television, and/or projector, in order to achieve maximum brightness with a single optical system and single image modulator, the multiple RGB channels may be combined for some portion of time during image frames. Adding these multiple RGB channels during an image frame duty cycle will increase the brightness of the image, but will also reduce the colorfulness by desaturating the pure RGB colors. FIG. 4 is a perspective view of a three-dimensional CIECAM02J L*a*b* opponent color space 10 depicting a series of color gamuts of an image display, projector, or television in which the gamuts have been sequentially reduced by the addition of white to the R, G, and B primary colors thereof. The outer (coarsest squares) color gamut 12 is the color gamut of one exemplary image projector having its primary colors produced by red, green, and blue LEDs. The wire frame color gamut 11 represents the CCIR709 video color standard. The successively finer squares solids 14, 16, 18, and 20 represent the color gamuts resulting from the addition of 6.25%, 12.5%, 25%, and 50% white, respectively. For the sake of simplicity of illustration, 2D projections of the color gamuts 11-20 are provided on the a*b* plane as respective closed curves 11A-20A. The color gamut 12/12A of the LED primaries has no added white. It can be seen in general from the 3D perspective renditions and the 2D projections that the addition of white always reduces the color gamut of the image device.

However, this does not mean that the addition of white to the images of the device cannot be beneficial. It can also be seen that the addition of white at a 6.25% level, as indicated by solid 14 and closed curve 14A, results in a color gamut that is approximately equal to the CCIR709 color video standard, while at the same time making the image perceived to be brighter. In an image rendering unit, and particularly in single modulation LED displays such as those employing a digital micromirror device (DMD), the image is made to appear brighter by the addition of white from combining RGB colors. In digital cinema, this may be done for some portion of the image frame time. The capabilities of human visual system adaptation are thereby exploited to increase the apparent brightness and lightness contrast of the displayed images.

In one aspect of the present invention, visual models of visual perception by the human visual system are used in determining the optimum amount of white to add to the colors of the image. The perceived colorfulness, contrast, and/or brightness of the image are enhanced, thereby improving the perceived quality of the image. The visual models of human visual perception may be used to create look-up tables of at least three dimensions to process the image to be displayed. The methods of the present invention may include performing empirical visual studies to determine the dependence of preference of colorfulness, contrast, or brightness on the ethnicities of the human observers, and defining the perceived quality of the image for each nationality of human observers. The colorfulness, contrast, or brightness of the image may be adjusted based upon the preferences of one of the ethnicities of the human observers.

FIG. 5 is a schematic diagram of a device for producing a color image, which may be observed by a human observer. The imaging device may include an image rendering unit such as e.g., a television, a display, a projector, or another unit. Referring to FIG. 5, the imaging device 30 may include an image color rendering controller 32 or computer 32 or other processor comprising a central processing unit 34 and a memory 36. As an alternative memory, or in addition to the memory 36, the controller 32 may include a computer readable storage medium 38 such as a hard disk. These components are in communication through a system bus 39. The device 39 may be further comprised of an image rendering unit 40, which may be an image display or projector, such as a liquid crystal display 42; a plasma display 44; a digital mirror device (DMD) 46 including a DMD 80, a lamp 82, and color wheel 84; or a digital mirror device 48 including a DMD 80, and red, green, and blue LED's, OLEDs or lasers 86, 87, and 88.

The imaging device 30 may process input image data that is stored on the storage medium 38, or the imaging device 30 may receive input image data from an external device or source 50. The external source 50 may comprise an Internet connection or other network or telecommunications connection, such that the input image data is transmitted through such connection.

The imaging device 30 may be adapted to a system for displaying or projecting an image in a variety of ways, depending upon the particular application. In some embodiments, the imaging device 30 may be provided as an integrated system comprising the controller 32 and the image rendering unit (display or projector) 40, which only needs to be connected to a source 50 of image input data. In another embodiment, the imaging device 30 may be separate from the image rendering unit 40, and in communication with the image rendering unit 40 through a network or telecommunications connection as described above. The imaging device 30 may be provided comprising the image color rendering controller 32, a first port (not shown) for connection to a source 50 of image input data, and a second port (not shown) for connection to the image rendering unit 40. This configuration is particularly useful for retrofitting to projection or flat screen televisions that receive signals via a cable that is connected to a broadcast source of image input data (e.g., "cable TV programming"). In such circumstances, the cable carrying input image data 50 could be disconnected from the image rendering unit 40, and the imaging device 30 could be placed in line between them to perform the image processing of the present invention.

In other embodiments, the imaging device 30 may be in communication with, or integrated into an auxiliary device 60 or auxiliary imaging device controller 60, which is in communication with the image rendering unit 40. The imaging device controller 60 may be, without limitation, an audio/video processor, a cable TV set-top box, a video game console, a personal computer (PC), a computer graphics card of a PC, or a DVD or Blu-ray player. In another embodiment, the imaging device 30 may be integrated into the electronics and processing components of a broadcast station, a broadcast antenna, receiver or processor, or a digital cinema theatre. In another embodiment, the device 30 may be integrated into the hardware and software of media creation, preparation, and production equipment, such as equipment used in the production of DVDs of movies and television programs, or the production of digital cinema for distribution to theaters. Broadcast stations, digital cinema theaters, and media production equipment may all be comprised of an auxiliary imaging device controller 60.

The memory 36 of the device 30 may contain a set of at least three dimensional lookup tables 54; each table of the set may be optimized for a different viewing environment of the image rendering unit 40. The device 30 may be provided with a sensor 70 for measuring the ambient light in the viewing environment of the image rendering unit 40, or in the case of a projector 46 or 48, in the viewing environment of the projected image. The memory 36 may contain a visual model of the perception of the human visual system that may be used to enhance the perceived colorfulness, contrast, or brightness of the produced image.

Figure 6:
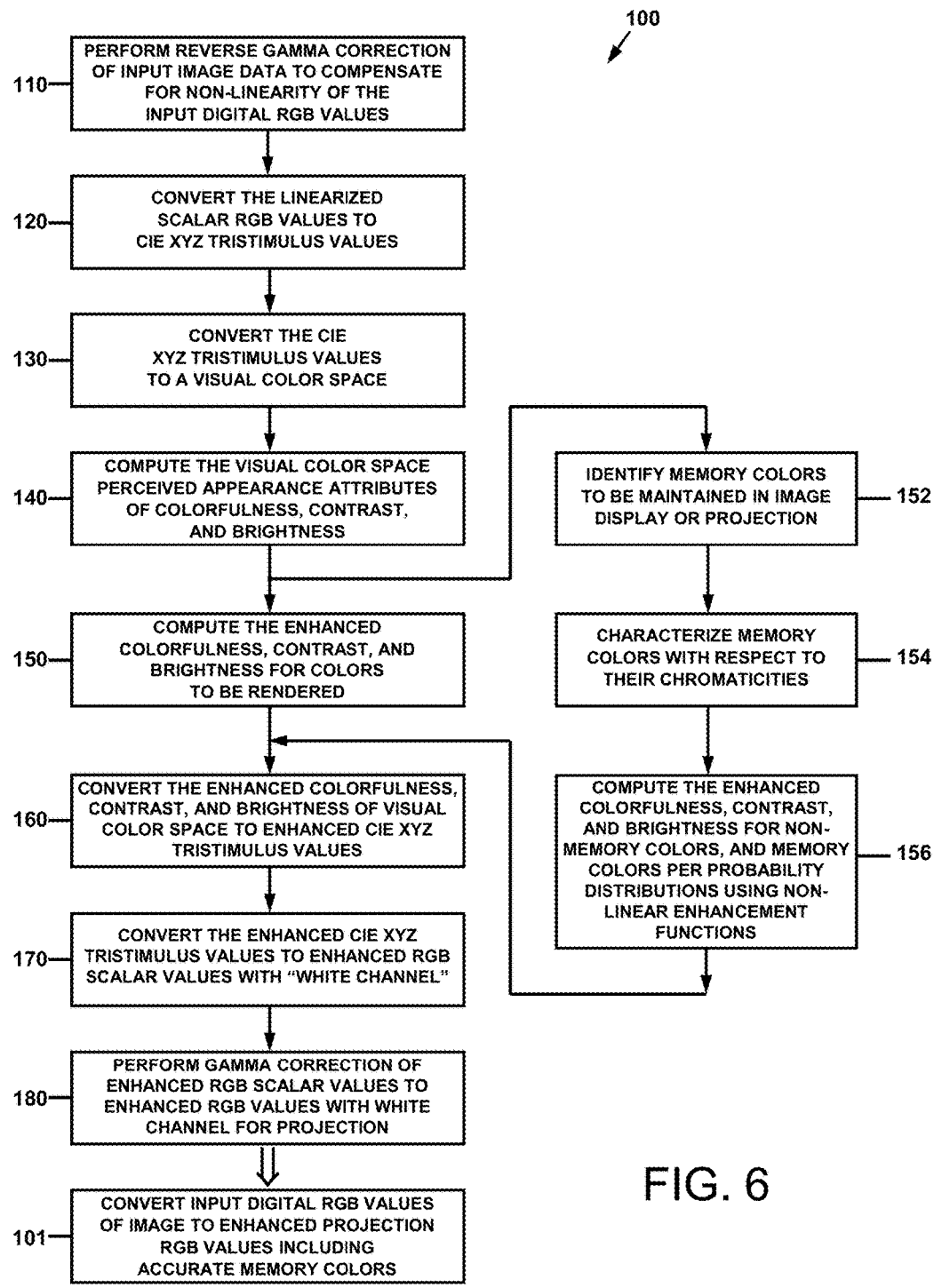
FIG. 6 is a flowchart depicting the steps of one algorithm for generating a three-dimensional lookup table for the purposes of this invention.

FIG. 6 is a flowchart depicting an algorithm for generating a three-dimensional lookup table to improve the perceived colorfulness, contrast or brightness in non-memory colors, while preserving to a higher degree the color accuracy of memory colors. The algorithm 100 of FIG. 6 may be used to perform step 210 of the method 200 of FIG. 7. Additionally, the algorithm 100 is applicable to other image rendering devices that use DMD, plasma, liquid crystal, liquid crystal-on-silicon modulation, or direct modulation of the light source, and using LED, OLED, laser, or lamp light sources.

Referring to FIG. 6, in operation 110, the RGB input values of the input image data are "reverse gamma" corrected to compensate for the non-linearity of this data, thereby producing linearized scalar RGB values. (The original input data is supplied with the expectation that it will be used in a display or projector that may have a gamma value of about 2.2, for example.) In operation 120, the outer product of the scalar RGB values and the projector matrix is taken to express the input image data as CIE XYZ tristimulus values. In operation 130, the tristimulus values are converted to a visual color space. The transformation to a visual color space enables perceptual modeling to be performed, which characterizes the interdependencies of color, contrast, and brightness, and allows the perception of memory colors to be preserved. The visual color space may be an opponent color space that accurately models constant perceived hue, and has the dimensions of lightness, yellow-blue, and red-green.

In operation 140, the visual color space predicted appearance attributes of lightness, chroma, and hue are computed. In operation 150, the enhanced lightness, chroma, and hue for colors to be rendered are computed. Operation 150 may include steps 152, 154, and 156 for maintaining memory colors in the rendering of the image.

In applications in which there are specific memory colors to be preserved, operation 150 of the method 100 may include steps 152, 154, and 156. More specifically, the method 100 may include the step 152 of identifying the memory colors in the input image data 50 to be substantially maintained. This may be done based on intuition and experience and/or market research data. It is known that observers of an image depicting human subject matter (such as a movie or television program) will find it objectionable if the colors of the skin, and faces in particular, of the humans in the image do not match those colors that they have in their respective memories of how the humans should look. They will perceive the humans as "not looking right," if they are too pink, orange, dark, light, etc. In like manner, certain other memory colors, such as "grass green" and "sky blue" must be rendered so as to appear as the observers remember them from experience. Regardless of how satisfactory the other colors in the image appear, the observers will find a product that does not render memory colors accurately to not be perceptually optimal, and will likely not buy the product, whether the product is an imaging device such as a television, or a movie to be viewed in a theater.

Once the memory colors are chosen, they are characterized with respect to their chromaticities in step 154 from both empirical data and the perceptual context in which they are seen. For instance, it is well understood that humans remember green grass and blue sky as more saturated than the actual stimuli. And, within reason, no matter the color of an illuminant, humans will remember a banana to appear to be a certain yellow (which may also be a memory color). Furthermore, these memory colors are not distributed across the extent of perceptual color in any systematic way. Hence, their representations must necessarily be made in a multi-variant, three dimensional, statistical sense and their rendering accomplished in a purely appearance or vision based color space. Algorithms may be employed using visual mathematics which ensure that the memory colors are specified in terms of perceived colors.

In step 156, the enhanced lightness, chroma, and hue for non-memory colors and memory colors are also computed. It is noted that in the color space of the input image data, a given memory color is not a single point within the space. To the contrary, memory colors are regions within the color space that are to be left at least perceptually unchanged, or much less changed during the color transformations of the instant methods to produce enhanced images. By way of example, the memory color "flesh tone" is a range of colors corresponding to the colors of very dark-skinned peoples of African ethnicity to very light skinned Caucasians or Asians. Accordingly, the memory colors are identified and characterized such that the colors within this region will be left unchanged or minimally changed in the color transformations.

Additionally, these memory colors may be characterized as not having rigid, discrete boundaries; this may be done so that in the color transformations to be performed, there is not a discontinuity in the degree of color change at a boundary of a memory color, as explained previously with reference to FIG. 2. In one embodiment, the memory color may be modeled using a probability distribution that provides a smooth transition from regions in the color space that are non-memory colors to the region defined as the particular memory color. Any smoothing function that changes the local multi-dimensional derivatives smoothly will be satisfactory. The probability distribution may use non-linear enhancement functions. An exemplary overall non-linear function that may be used is $$\text{Output} = 0.0001 + \left(\frac{1.5 \times \text{Input}^{EXP}}{0.5 + \text{Input}^{EXP}}\right)$$

In operation 160, the enhanced lightness, chroma, and hue of the visual color space are converted to enhanced CIE XYZ tristimulus values. In operation 170, the enhanced CIE XYZ tristimulus values are converted to enhanced RGB scalar values with "white channel." In operation 180, gamma correction of the enhanced RGB scalar values is performed to produce a 3DLUT containing enhanced RGB values with white channel. The 3DLUT may then be used in the method 200 of FIG. 7.

FIG. 6 concludes with a simple statement 101 of the net effect of the operations 110-180. The 3DLUT, which is of at least three dimensions, is created as a discrete sampling of the visual model and contrast/color/brightness HVS perceptual improvement mathematics, and may include preservation of memory colors. Referring also to FIG. 5, the at least 3DLUT 54 may be generated by the CPU 34 of the imaging system 30 according to an algorithm 52 stored in memory 36 or on the readable storage medium 38. Alternatively, the at least 3DLUT 54 may be generated by another computing system and uploaded to the system computer 32. The algorithm 52 of FIG. 5 for generating the at least 3DLUT 54 may be algorithm 100 of FIG. 6.

Figure 7:
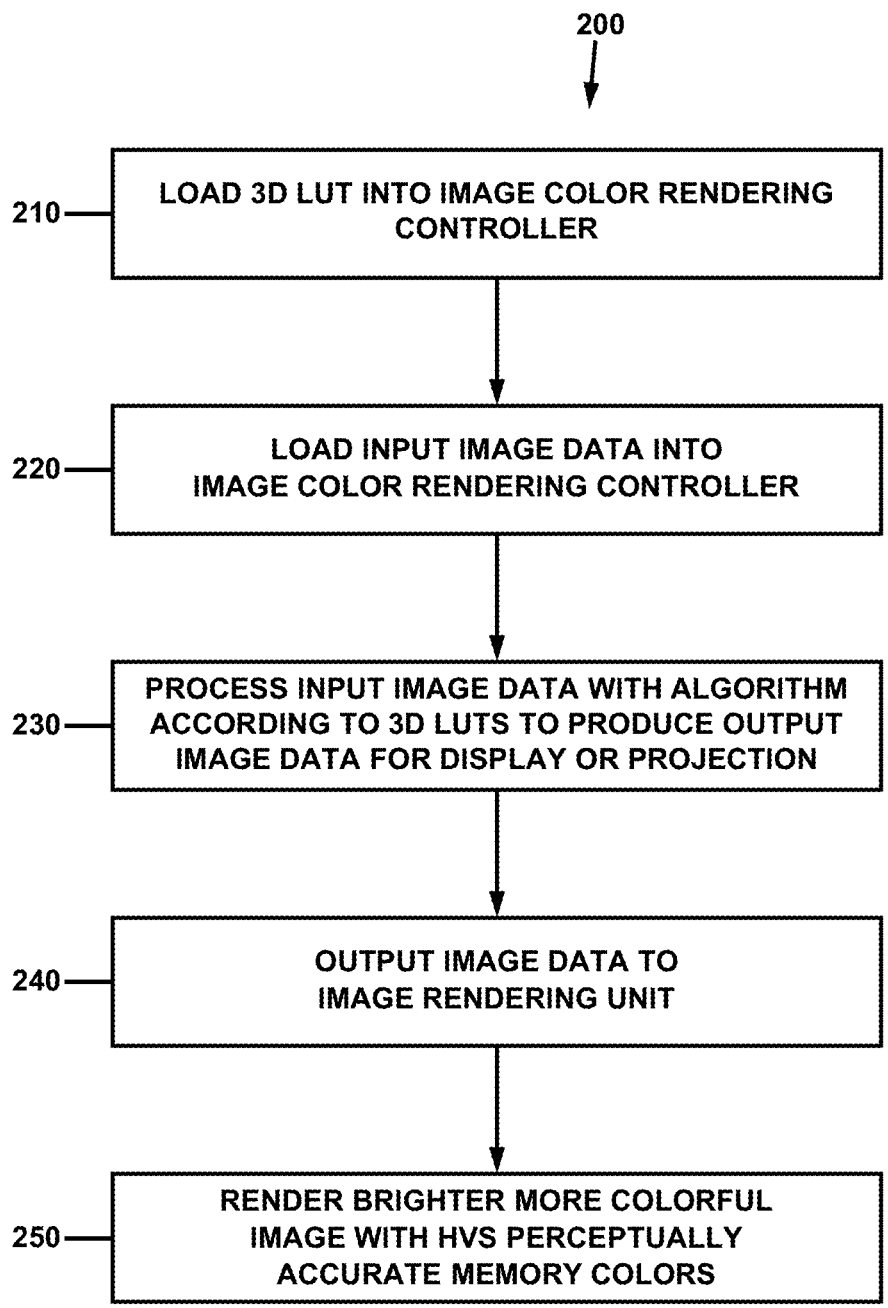
FIG. 7 is a flowchart depicting one method for producing a color image in accordance with the present disclosure.

FIG. 7 is a flowchart depicting one method for rendering a color image in accordance with the present disclosure. The method may be performed using the imaging system 30 depicted in FIG. 5. Referring again to FIGS. 5 and 7, in step 210, the 3DLUT 54, which may be produced according to the algorithm 100 of FIG. 6, is loaded into the memory 36 or the readable storage medium 38 of the imaging device 30. In step 220, the input image data from the source 50 is communicated to the CPU 34. The input image data may be of a first input color standard, and may be converted into an input color specification for inputting into the at least three-dimensional look-up table. In step 230, the input image data is processed with an algorithm 56 that may be stored in memory 36, using the at least three-dimensional look-up table 54 to produce rendered image data. In step 240, the rendered image data is output to the image display/projection device 40, and a high brightness, high contrast, and high colorfulness image is displayed or projected in step 250. The image may include human visual system perceptually accurate memory colors. The method 100 may be repeatedly performed at a high rate on sequences of image input data, such as at the rate of 24 or 48 "frames per second" used in digital cinema, or such as at the rate of 30, 60, 120 or 240 frames per second used in consumer displays.

Referring again to FIG. 5, and in one embodiment, the 3DLUT 54 of input colors and output colors may contain, or the values therein may be determined from, the definition of secondary colors, and enhanced lightness, chroma, and hues to increase perceived colorfulness, contrast, or brightness to compensate for the loss in perceived colorfulness, contrast, or brightness due to addition of secondary colors by the image rendering unit 40. In another embodiment, the 3DLUT 54 of input colors and output colors may contain, or be determined from, a transformation from a suboptimal viewing environment to an improved viewing environment including the visual adaptation of the human visual system.

In another embodiment, the method may include providing input image data 50 of a first color gamut, and an image rendering unit 40 having a second, expanded or reduced color gamut. The 3DLUT 54 of values of input colors and output colors is generated, wherein the values in the 3DLUT 54 are calculated based upon a visual model of the human visual system, thereby expanding the input image data 50 to encompass the second color gamut of the image rendering unit 40.

In another aspect of the invention, the image rendering unit 40 may be provided with some color modification capability that is built in or embedded in hardware or software. For example, the device may be provided with an algorithm to add white or secondary colors, resulting in a loss of colorfulness, and a distortion in the appearance of memory colors. In such circumstances, the output values in the 3DLUT 54 are determined such that the input image data 50 is processed to compensate for the color modification performed by the image rendering unit 40. The method may thus include providing the 3DLUT 54 to adjust the color data in a manner that shifts it in a direction within the color space that compensates for the embedded color modification that is performed by the image rendering unit 40. The 3DLUT 54 further comprises processing the input image data to increase perceived color, brightness, and contrast to compensate for the reduction in perceived color, brightness, and contrast caused by the algorithm for color modification in the image rendering unit 40.

In a more specific instance in which the image rendering unit 40 includes an algorithm for creating secondary colors from primary colors, the 3DLUT 54 may further comprise compensating for the color modification performed by the addition of the secondary colors in the image rendering unit 40. The values in the 3DLUT 54 may also be determined such that the 3DLUT 54 further comprises processing the input image data 50 to include chromatic adaptation of the human visual system to a specified white point that increases the brightness of the image rendering unit 40.

In another aspect of the invention, the image rendering unit 40 may unintentionally contain some color modification capability resulting from variation in one or more parameters of the unit 40. For example, if the image rendering unit 40 is an OLED display, then over the life of the display, color modification may occur due to the differing life spans between blue OLED and red and green OLEDs of the display, as described previously herein. During the operation of the OLED display, the differential color change between the blue OLED and the red and green OLEDs will change the color balance of the display if no countermeasures are instituted.

In such circumstances, the output values in the 3DLUT 54 may be determined such that the input image data 50 is processed to compensate for the predicted decrease in luminance of the blue OLED. The method may thus include providing the 3DLUT 54 to adjust the color data in a manner that shifts it in a direction within the color space that compensates for decreasing blue OLED luminance. The 3DLUT 54 further comprises processing the input image data to increase perceived color, brightness, and contrast to compensate for the reduction in perceived color, brightness, and contrast caused by the continual loss of blue OLED luminance.

The 3DLUT 54 may also adjust the colorfulness, contrast, or brightness of the image to be produced to appear as it would in an image from an analog film system or digital system used in cinemas. It is known that film is generally not designed to reproduce color as the eye sees it at the filming site. (A color gamut 416 for film is shown in FIG. 3.) Instead, the colors in film images have increased contrast and increased colorfulness in anticipation of the viewing environment in which the film images will be observed. It is also known that digital systems aim to match the look of film images. Accordingly, the 3DLUT may be designed to provide the same effect in a cinema.

The production of the 3D LUT 54 is not limited only to the algorithm 100 of FIG. 6. Bit depth modification and interpolation as described herein may also be applied to all of the applications herein which include the use of 3DLUTs. The 3DLUT may vary in bit depth, depending upon the capacity of the memory 32 and the processing power of the CPU 34. In one embodiment, the 3DLUT may be a twelve bit table with 4096×4096×4096 discrete addresses containing three or more color values of predetermined bit precision. In another embodiment, some bits of the table may be used for interpolation between adjacent values. For example, the final two bits of respective adjacent table values may be used in interpolating colors between them. Other methods of multi-dimensional interpolation are known, and are included in embodiments of implementing the 3DLUT. Additionally, the input data may contain more than three primary colors such as RGB. For example, the input data may contain RGBCMY (wherein C=cyan, M=magenta, and Y=yellow), or some lesser combination such as RGBCM. In such an instance, the 3DLUT could have outputs of RGBCMYW.

Depending upon the particular application, the algorithm 100, or other algorithms that may further include bit depth modification and interpolation, may be used to produce more than one 3DLUT. One factor that may be used to determine the values in the 3DLUT is the set of characteristics of the display or projection device. Referring again to FIG. 5, different 3DLUTs 54 may be produced for different image output devices, for example, an LCD display 42, a lamp-and-color-wheel DMD projector 44, and an LED DMD projector 46. The characteristics of the display or projection device 40 include the "color engine" of the device, and whether it includes only RGB as the primary colors, or has more than three colors. The 3DLUTs 54 may be losslessly compressed to reduce storage use in the memory 36 of the image color rendering controller 30.

Other factors pertain to the "surround," i.e., the viewing environment of the display or projection device 40, such as the ambient lighting of the room in which the display or projection occurs, and the lighting and/or surface immediately surrounding the display/projection screen. In general, the 3DLUT values provide a displayed/projected image having more contrast, brightness, and colorfulness for any "surround", i.e. viewing environment; for example, a particular room lighting and any conversion from that room lighting to an improved room lighting. If the room lighting is darker or brighter than a desired level, the generation of the 3DLUT 54 may include a visual adaptation transformation to produce a perception of improved viewing environment. The visual adaptation transformation is based upon visual models that may include models of the adaptation of the human vision to viewing environments.

For example, in a dark room there is essentially no ambient lighting (other than minimal safety and exit lighting), but using a visual adaptation transformation to increase contrast and colorfulness in a manner analogous to that used in motion picture print film to provide the perception of an improved viewing environment to an observer. As the room lighting increases and the image brightness increases to about the same level, the adaptation transformation is still needed because it the room lighting is still not as bright as daytime outdoor lighting, while the ambient lighting must be compensated for. In summary, the visual adaptation transformation implemented in the 3DLUT 54 uses visual adaptation models to produce the effect of improved viewing environment.

Other factors in generating the 3DLUT 54 may include a knowledge of the different sensitivities to colorfulness in different worldwide regions, or the intended use of the displayed/projected images; for example, whether the images are viewed in a video game that is being played, or viewed as a movie or television program.

These multiple 3DLUTs 54, or a subset of them may be stored in the memory 36 of the computer 32 of the device 30. Additionally, data on the viewing environment factors 58 may be stored in memory. The image device 30 may include a keyboard (not shown) or other input device to access a user interface (not shown) that may be displayed on the display or projector 40 (or other user interface screen). The user interface may offer the capability of inputting data on the viewing environment factors 58, and/or other factors such that the optimum 3DLUT is selected from the stored 3DLUTs 54 for the particular display or projector 40 and viewing environment. In that manner, the most perceptually optimal images are provided to the user by the system 30. The 3DLUTs 54 are effective for the enhancement of a variety of images, including but not limited to games, movies, or personal photos. Additionally, some improvement of grey scale images is attained by the resulting contrast and brightness enhancement thereof.

The 3DLUT 54 may be produced according to variants of the method 200 such that it has additional or alternative characteristics. The values in the 3DLUT 54 may be provided to convert a first color gamut of an input image data set 50 to encompass a second expanded or reduced color gamut of an image rendering unit 40 that is connectable to the device 30. The 3DLUT 54 may contain a transformation from a suboptimal viewing environment to an improved viewing environment in which the color image is to be observed, including the visual and chromatic adaptation of the human visual system. The 3DLUT 54 may contain the definition of secondary colors, and enhanced lightness, chroma, and hues to increase perceived colorfulness, contrast, or brightness to compensate for the loss in perceived colorfulness, contrast, or brightness due to addition of secondary colors by an image rendering unit 40 that is connectable to the device 30.

In another aspect of the invention, the methods of producing a color image may include input color standard transformation and color output calibration of the image rendering device that is in use. This is best understood with reference to FIG. 8, which is a schematic diagram of an alternative method 300 for producing a color image, which includes such color output calibration. The diagram includes color output calibration operations 350, 360, and 370; however, for the sake of clarity, the entire method depicted in FIG. 8 will be described, with reference also to FIGS. 6 and 7.

In operation 310 ("Gamma1"), the input values of R, G, and B are reverse gamma corrected to compensate for the non-linearity of this input data standard, thereby producing linearized scalar values $R_i$, $B_i$, and $G_i$. This correction may be done using the respective one dimensional lookup tables 311, 312, and 313. The input values of R, G, and B may be between 8 and 12 bits (314 in FIG. 8) inclusive. The output values of $R_i$, $G_i$, and $B_i$ may have 16 bit resolution (315 in FIG. 8), depending upon the architecture of the image color rendering controller 32, and also upon the need for the greater bit depth of the imaging standards being used. The input R, G, and B values may be provided from various devices, such as a video camera having an output in accordance with standard BT.709. In such circumstances, the value of gamma used in the correction may be 2.2. The input R, G, and B values may be provided in accordance with other imaging standards, and other values of gamma and other 1D lookup tables 311, 312, and 313 may consequently be used in the reverse gamma correction as needed.

Figure 8:
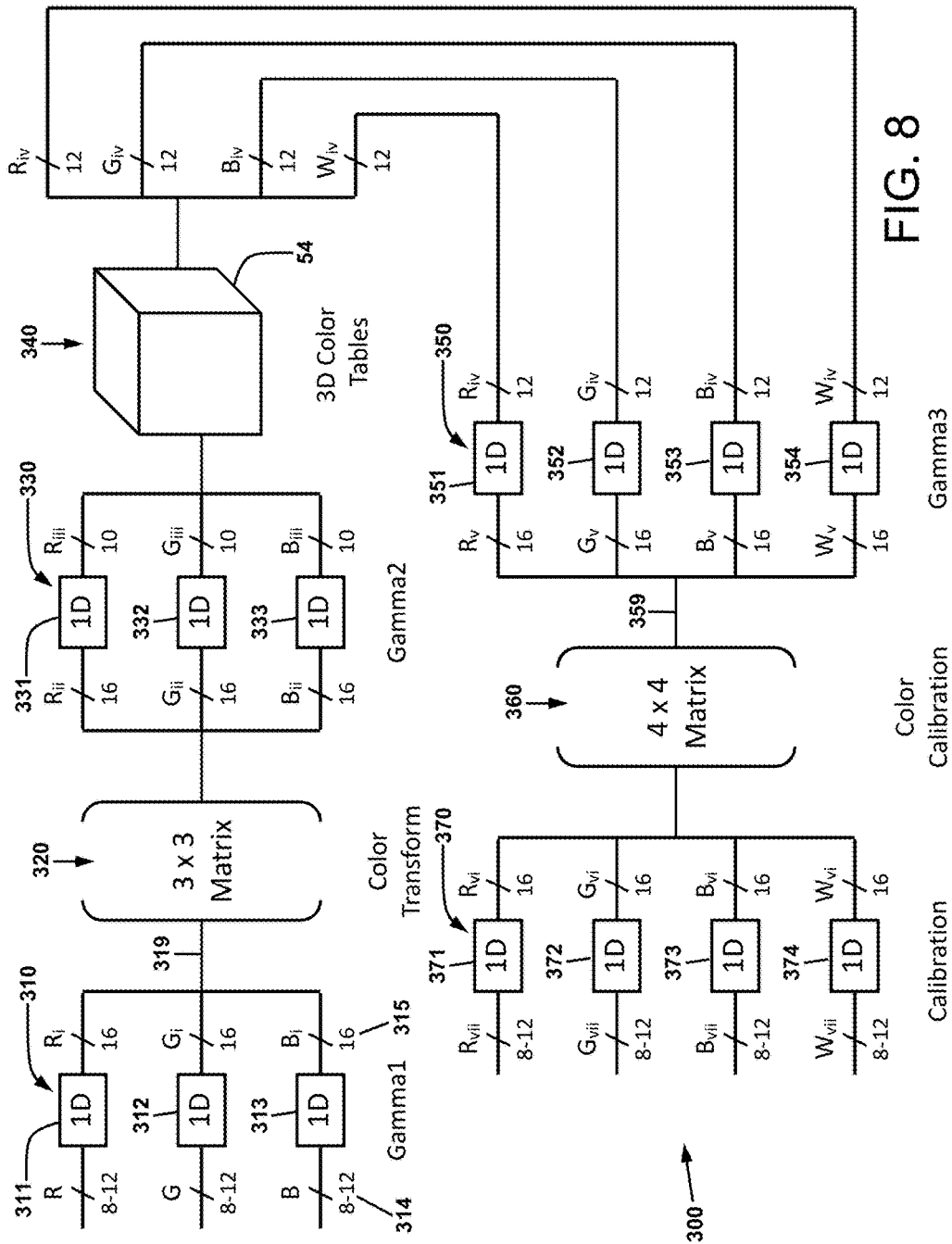
FIG. 8 is a schematic diagram of one mathematical flowchart for producing a color image in accordance with the present invention, which includes color output calibration.

In operation 320 ("Color Transform"), every color value in the image data stream 319 represented by a unique $R_i$, $G_i$, and $B_i$ combination is then operated on by a 3×3 matrix determined by the particular imaging standard being used to perform a color transformation to $R_{ii}$, $G_{ii}$, and $B_{ii}$ values that are linearized scalar values referenced to the standard BT.709. The $R_{ii}$, $G_{ii}$, and $B_{ii}$ values may be provided with a bit resolution of up to 16 bits as indicated in FIG. 8.

In operation 330, ("Gamma2"), the values of $R_{ii}$, $G_{ii}$, and $B_{ii}$ are gamma encoded to re-introduce a non-linearity into the processed data, thereby producing gamma encoded values $R_{iii}$, $B_{iii}$, and $G_{iii}$ for input to the 3D color tables. This encoding may be done using the respective one dimensional lookup tables 331, 332, and 333, using a gamma encoding factor of 1/2.2, in one embodiment. Other factors may be suitable, depending upon the particular imaging standards being used. The resulting values of $R_{iii}$, $B_{iii}$, and $G_{iii}$ may be reduced to 10 bit resolution as shown in FIG. 8, to enable sufficiently fast subsequent processing using the 3D color tables 54. The gamma encoding enables a reduction in the number of bits from 16 for linear data to much less for gamma encoded data, such as 10 bits, without artifacts. This makes the at least 3D table much smaller. It is effective to use fewer gamma encoded bits because the eye sees image data in a manner analogous to a gamma encoder.

In operation 340, the three dimensional color tables 54 are used to process the data to produce output image $R_{iv}B_{iv}G_{iv}W_{iv}$ data for display or projection. In this embodiment, the table 54 is 3D in (RGB) and 4D out (RGBW). Other table structures of at least three dimensions may be used, depending upon the particular application. Additionally, for the sake of simplicity of illustration, there is only one table 54 shown in FIG. 8; however, it is to be understood that there is a first 3D LUT for determining $R_{iv}$, a second 3D LUT for determining $G_{iv}$, a third 3D LUT for determining $B_{iv}$, and a fourth 3D LUT for determining $W_{iv}$, where a white channel is implemented. In this embodiment, the white could be for an OLED display, or the signal that drives the combination of RGB to make the image rendering device brighter. Alternatively, the white could be replaced with cyan, or some other color in a four-color image rendering device, such as a four-color TV. The $R_{iv}B_{iv}G_{iv}W_{iv}$ data may be provided at a 12 bit resolution as indicated in FIG. 8.

At this point, the $R_{iv}B_{iv}G_{iv}W_{iv}$ data, including the addition of white for increased brightness or color management of OLED devices may represent a generic display with typical color primaries and linearity. Additionally, however, further operations may be performed to further optimize the $R_{iv}B_{iv}G_{iv}W_{iv}$ data by calibration for the particular image rendering unit (display or projector) 40 that is in use. The measurement or specification of this particular image rendering unit 40 can be done in manufacturing on done on-site by a technician with conventional linearity and primary color measuring tools.

Referring again to FIG. 8, in operation 350 ("Gamma3"), the $R_{iv}B_{iv}G_{iv}W_{iv}$ data is first reverse gamma-corrected to produce $R_vB_vG_vW_v$ data. This correction may be done using the respective one dimensional lookup tables 351, 352, 353, and 354. The output values of $R_v$, $G_v$, $B_v$, and $W_v$ may have 16 bits. The value of gamma used in the correction may be 2.2, or another value in accordance with the gamma encoder 310.

In operation 360 ("Color Calibration"), every color value in the image data stream 359 represented by a unique $R_v$, $G_v$, $B_v$, and, and in many cases, $W_v$ combination is then operated on by a 4×4 matrix. This 4×4 matrix is produced for and is unique to the particular image rendering unit 40 of FIG. 5 that is in service. The matrix is calculated from measured or specified values that define the color primaries of the particular image rendering unit 40. The purpose of the operation is to convert from the assumed or generic color primaries in the at least 3D color table to the actual ones in the image rendering unit 40. The visual effect is to adjust for white and the rest of the colors so they are not "tinted" (e.g., a little yellow or blue), because the image rendering unit may have slightly different color primaries than were assumed in creating the at least 3D table. For standard televisions or projectors, those assumptions are in accordance with the aforementioned BT.709 standard, because most TVs, displays, and projectors adhere to this standard. A given image rendering device may be tinted, e.g., more yellow, however so the calibration matrix compensates for that variation. The $R_{vi}$, $G_{vi}$, $B_{vi}$, and $W_{vi}$ values may be provided with a bit resolution of up to 16 bits.

In operation 370, ("Calibration"), the $R_{vi}$, $G_{vi}$, $B_{vi}$, and $W_{vi}$ values are gamma encoded to introduce the correct non-linearity into the processed data for the image rendering unit 40, thereby producing the $R_{vii}$, $G_{vii}$, $B_{vii}$, $W_{vii}$ values that, when used by the particular image rendering unit 40 to project or display the image, produce chosen non-linearity defined by the 3D table. This encoding may be done using the respective one dimensional lookup tables 371, 372, 373, and 374. In one embodiment, a gamma encoding factor of 1/2.2 may be used. Other factors may be suitable, depending upon the particular imaging rendering unit 40. The resulting values of $R_{vii}, G_{vii}, B_{vii}, W_{vii}$ may be output having between 8 and 12 bit resolution as indicated in FIG. 8.

In another aspect of the invention, the problem of displaying high quality images on a portable display device over an extended period of time is solved by modifying the primary colors of the display device such that the resulting new primary colors are more efficient. This enables power to the device to be reduced, such as by using a lower power light source (for a liquid crystal display), or by using a lower power lamp or lower power LEDs or OLEDs of primary colors or white. This results in less heat production and less other display management costs.

In certain embodiments, adaptive color processing is used to improve image quality in any ambient lighting. The red, green, and blue primary colors of the display are redesigned to provide increased efficiency and brightness. This enables reducing power consumed by the display back to the initial brightness levels of the unmodified display.

It is known that when the brightness of a display is reduced in dark and dim lighting, the color is also reduced. To the best of the Applicants' knowledge, heretofore there have been no satisfactory methods to address that problem. The redesigns of color primaries as referenced above are accompanied by significant losses in color saturation. These losses are recovered through the use of three dimensional lookup tables (3DLUTs). The Applicants 3DLUTs are determined using visual models as described previously herein, which provide completely independent output color design capability to compensate for color losses in different ambient lighting. These models of the human visual system include chromatic visual adaptation. The application of the Applicants' methods of defining and using 3DLUTs to power savings in displays will now be explained.

In the instant methods, color losses are compensated for when display brightness is reduced; and for smaller gamut displays, color losses are compensated for when color primaries are adjusted to be more efficient, i.e., brighter, for power savings. There are a variety of ways to modify the sources of primary colors of a display to make it more efficient and to increase brightness. In an LCD display comprising a backlight, because power and brightness are directly related, the brightness increases can be used directly to reduce power. For example, a 100% increase in brightness can be used to decrease power 50%, according to the equation $$PR = 1 - 1/B$$

where PR is the power reduction and B is the decimal brightness. It can be seen that for a 100% brightness increase, i.e., a doubling of the brightness, B=2.0 and PR=0.5=50%.

Although a number of methods to modify the color primaries have been suggested by others for mobile devices, they have all been difficult to implement because they cause a significant loss in color saturation and color hue errors while lacking methods to restore the colorfulness of the display.

In contrast, the methods disclosed herein restore the colorfulness for modified chromaticity color gamuts and desaturated color primaries. The methods of color mapping use 3DLUTs, which are determined using visual models and colorfulness increases based on visual compensation for ambient lighting losses in colorfulness. Using visual models and compensation for colorfulness loss in various ambient lighting is a preferred approach to restore the colorfulness with color primary changes, because the color increases are very natural perceptually, since they represent what colorfulness a human observer would perceive in better lighting conditions. The use of visual models enables smooth increases in colorfulness throughout the full color gamut volume at all brightness levels.

In building a 3DLUT, a gamut mapping method is also used, which avoids loss of detail due to brightness and hue changes that are common in more standard gamut mapping approaches. This is beneficial because there are significant color gamut issues with modified chromaticities. (See for example, Daly, et al., "*Gamut Mapping in LCD backlight compensation*", $16^{th}$ Color Imaging Conference, May 31, 2011.)

In certain embodiments of the instant method, significant brightness increases and power savings are achieved by adding an adaptive and controlled amount of white in a $4^{th}$ sub pixel to an image display of a standard backlight LCD display; while restoring the corresponding losses in colorfulness by the use of the Applicants' 3DLUTs. Because the added white and increased brightness is adaptive and different for every pixel in a given image, the brightness increase and resultant power savings are image dependent. As will be explained, more power savings are available for images that are of lower color saturation and/or more black and white with less color. A brightness increase map for an image will be provided, with the average power savings equal to $(1-1/B_{ave})$, where $B_{ave}$ is the average new brightness increase. Accordingly, a 100% average brightness increase has a $B_{ave}$=2.0 and a power savings of 50%, as noted previously. In practice, the desired power savings may be set to an amount selected through analysis of a typical set of images. For any given image, if the selected power savings to be attained is too high, the image will be slightly dimmer, and if it is too low the image will be slight brighter. To compensate for a slightly dimmer image, the power savings may be biased lower that the optimum available amount to provide some extra brightness in the overall processing and the resulting images.

As an alternative method, the Applicants have considered adding static amounts of white to every pixel of an image, thereby decreasing the color saturation for all levels of pixel saturation. This requires the most color restoration because the most saturated pixels lose a significant amount of color and the color gamut with added white is reduced significantly. In analyzing this approach, it was discovered that a better approach is to add white and brightness adaptively with more white added to less saturated pixels. This allows more white and brightness increase on average with higher overall power savings and less loss of color saturation and gamut prior to the use of the Applicants' 3DLUTs to produce the output images.

Results from one example of adding static amounts of white to every pixel of an image indicated a brightness increase of 105%, which corresponded to a power savings of about 51%. In contrast, using the Applicants' 3DLUTs resulted in the calculated colorfulness from the loss in color gamut (compared to the sRGB color gamut) due to adding white increased from 22.6 to 43.3 or an increase of 91%. These results are summarized in TABLE 1.

TABLE 1

Comparison of brightness, power savings and colorfulness for sRGB and static white sub pixel amounts using optimal block dyes and chromatic adaptation to the new white point with differing amounts of added white for each primary.

| Color Primaries | U % Open White | Lightness (lux) | % Brightness Increase | Power Savings | Colorfulness Measure without use of 3DLUTs and chromatic adaptation | Colorfulness Measure with use of 3DLUTs and chromatic adaptation |
|---|---|---|---|---|---|---|
| sRGB | | 14.6 | 0 | 0 | 22.6 | |
| Optimal Block Dyes | 10% Blue 20% Red 30% Green | 29.9 | 105% | 51% | 23 | 43.3 |

Figure 14A:
FIGS. 14A-14C show image simulation results from one embodiment of the Applicants' method of displaying a color image.
Figure 14B:
Figure 14C:

As will be explained presently, this colorfulness measure is linear with the colorfulness ranking by users for a large sample set of images. Power savings may be achieved by adding white (or "open filter" regions in LCD displays) to each pixel with high color saturation using the Applicants' 3DLUTs and chromatic white point adaptation. FIGS. 14A-14C show image processing results from the instant method that is summarized in TABLE 1. FIG. 14A is an original sRGB image that may be displayed by an imaging device at a given level of power consumption. FIG. 14B is the image that results from adding 10% white to blue, 20% white to red and 30% white to green for each pixel of the image. In an LCD display, the additions of white can be made by increasing the transmittance of the respective color filters for the red, green, and blue subpixels. The increase may be accomplished by increasing the transmittances within the existing filter wavelength ranges, or by broadening the spectral ranges that the filters will pass (i.e., transmitting "less pure" red, green, and blue), or by a combination of these. Alternatively, a white subpixel may be added to each pixel, or "open filter" regions surrounding the red, green, and/or blue subpixels may be added to each pixel. In addition to the addition of white to the image of 14B, the power provided to the backlight of the LCD display has been reduced. This results in an image that has approximately the same brightness as the image of FIG. 14A, but at a significantly reduced power consumption.

However, it also can be seen that the addition of the respective amounts of white to the red, green, and blue subpixels has resulted in the image of FIG. 14B being significantly desaturated. FIG. 14C depicts an image that has been further processed using one of the Applicants' 3DLUTs. The color restoration is significant over the unprocessed image in FIG. 14B, illustrating the effectiveness of the Applicants' method. The overall colorfulness of the image has been restored to a level comparable to that of FIG. 14A, but at approximately the reduced power consumption level of FIG. 14B. The overall power savings of this example is 51%, as indicated in TABLE 1. Hence by the use of the Applicants' 3DLUTs and chromatic adaptation, power consumption by the display is reduced while maintaining high quality color images.

Although the above analysis is for a backlight LCD display with a white LED light source, the instant methods applies to any display technology such as OLED, laser, RGB LED display, and displays with inherently large initial color gamuts such as those with nanotechnology color primaries. In each case the 3DLUTs will need to be modified depending on the display physics, but results similar to those above will be achieved. Additionally, the larger the starting color gamut of the display, more power savings can be achieved. The above example is based upon adding a static amount of white for each pixel, so the loss in color saturation is throughout the color space.

From a comparison of colorfulness values in TABLE 1 before and after color processing with the Applicants' 3DLUTs, it can be seen that the applicants' method can produce the same overall CieCam02 perceptual colorfulness volume for a color gamut that is greater than 50% smaller in CieLuv. This is one way in which power savings can be achieved and it also shows that by using the Applicants' method, the cost of an acceptable display can be reduced significantly with a much smaller color gamut.

EXAMPLES OF DISPLAY POWER SAVINGS

1.) Summary of Examples

General Principles

Certain aspects of the Applicants' methods to increase the efficiency and thus reduce the power consumption of a color display will now be described in further detail by way of examples. In the following disclosure, it is noted that all examples and their analyses were made by image simulation and visual analysis. Although no actual display hardware was modified, the Applicants believe that the analyses disclosed herein result in the same conclusions as would be reached if modifications were made to a display and then display image data were obtained.

In the following examples for an LCD display, an adaptive amount of white was added to each pixel of a given image to increase brightness. The average brightness increase for each image was then calculated and used to estimate the power savings for that image. The added white was assumed to be provided by a $4^{th}$, controllable pixel that was either produced by a $4^{th}$ clear filter with full transmittance of the backlight white, or a time-dependent white light segment being a portion of the exposure time of a pixel, or possibly a separate white light source that is added to the pixel exposure. Adding a white sub-pixel in image displays has been disclosed in a variety of technical papers including "*Review paper; Multi-primary-color display: The latest technologies and their benefits*" Teragawa, et all, SID20.1.1.

In one aspect of the power savings invention, the Applicants' 3DLUTs are used to restore color as shown by the change in the image of FIG. 14B to FIG. 14C. Additionally, in certain embodiments, a unique pixel dependent addition of white that is a function of the original pixel saturation is applied to the image. In certain embodiments, a Gaussian function of pixel saturation may be used to calculate the pixel-dependent amount of added white, with less white added as the original pixel saturation increases. Advantageously, this pixel dependent addition of white helps to preserve the original color gamut of the display, and only desaturates the pixels that have lower original color saturation.

The calculation of this Gaussian white value can be implemented in real time on images so that the power savings can be achieved image-by-image using a single one of the Applicants' 3DLUTs. The Applicants have found that grey scale images with the least amount of color have the most power savings, because the amount of added white and brightness increase was highest for grey, neutral pixels. The maximum amount of added white at the peak of the Gaussian function and the width of the Gaussian function in color saturation were varied in the analysis to study and compare the resulting image quality and power savings. Two different levels of maximum white were examined: 1.0 and 2.0, with 1.0 meaning the maximum white added was equivalent to the white attained from the combination of the red, blue, and green primary colors of the display; and 2.0 meaning the added white was two times greater than the white attained from the combination of the red, blue, and green primary colors of the display.

It will be apparent that other levels of maximum white may be suitable for achieving a desired level of power savings. It is also to be understood that other decreasing functions can be used to define the pixel-dependent amount of added white, which achieve satisfactory power savings results. The present invention is not limited only to Gaussian functions.

Since a clear filter of an LCD display will have much higher transmissivity than the combined red, green, and blue filters, it is noted that in certain embodiments, this maximum added white may be increased even beyond the 2.0 factor. Higher factors may be advantageous when actual hardware displays are modified to implement this adaptive white image display and power saving method.

2.) Summary of Examples

Images Analyzed

Ten images were analyzed in this study. The range of power savings achieved was from 36%—50% for an added white maximum of 1.0; and 53%—67% with an average of 64% for the ten images for an added white maximum of 2.0. As will be seen from the image comparisons to be presented subsequently, no loss in total color gamut or visual color quality occurred after application of the Applicants' 3DLUTs and chromatic adaptation. This illustrates the value of using the instant adaptive white method over the previously referenced static white method, which had a power savings of 51%. It is also in agreement with the Applicants' previously disclosed apparatus and methods for displaying a color image, which provide the most increase in color saturation for low and mid-level saturated pixels to improve the average visual color of images. It is also consistent with image statistics in general, which indicate that pixels of images predominantly have low-to-mid level color saturation. It can be seen that the Applicants' power savings method is supported by image statistics in that advantageously, the greatest brightness increase and the greatest power savings occur in the most common pixels.

It is noted that the Applicants' adaptive white method may be applied to any display that has a controllable 4$^{th}$ white sub pixel with time or area segmentation and any starting color gamut. Static or mobile liquid crystal displays, plasma displays, OLED displays, and projectors with time dependent control of primary colors are all display technologies in which the Applicants' power savings methods may be implemented. In terms of commercial products, and without limitation to the following list, the Applicants' power savings methods may be applied to televisions, computers, tablets, cell phones and games.

3.) Image and Color Primary Modification Methods

The steps of modification of the primary colors and for subsequent image modification will now be described. These steps were used in the examples described subsequently, and are also applicable in general to power savings in the above-recited displays.

(a) The color primaries of the display are to be defined. The display may have sRGB color primaries.
(b) An amount of white is added to each RGB pixel to increase the brightness, $T_2$ below. The amount of white is adaptive, i.e., for any given pixel, the amount is dependent upon the level of color saturation of that pixel. The amount of white added as a function of color saturation may be determined from the following equations:

$$T_1 = \min(rgb)$$
$$T_2 = z \times (T_1)$$
$$z = Ae^{-\left(\frac{(x-x_w)^2}{2\sigma_x^2} + \frac{(y-y_w)^2}{2\sigma_y^2}\right)}$$

where
"min(rgb)" means the minimum common value; for example, in the preceding example where the additions of white were 10% white to blue, 20% white to red, and 30% white to green, "min(rgb)" is 10%.

x and y are the pixel chromaticity values;
$x_w$ and $y_w$ are the chromaticities of the white point;
A is a chosen parameter that specifies the maximum white added at the white point; and
$\sigma_x$ and $\sigma_y$ are chosen parameters that specify the width of the Gaussian in chromaticity.

Figure 15:
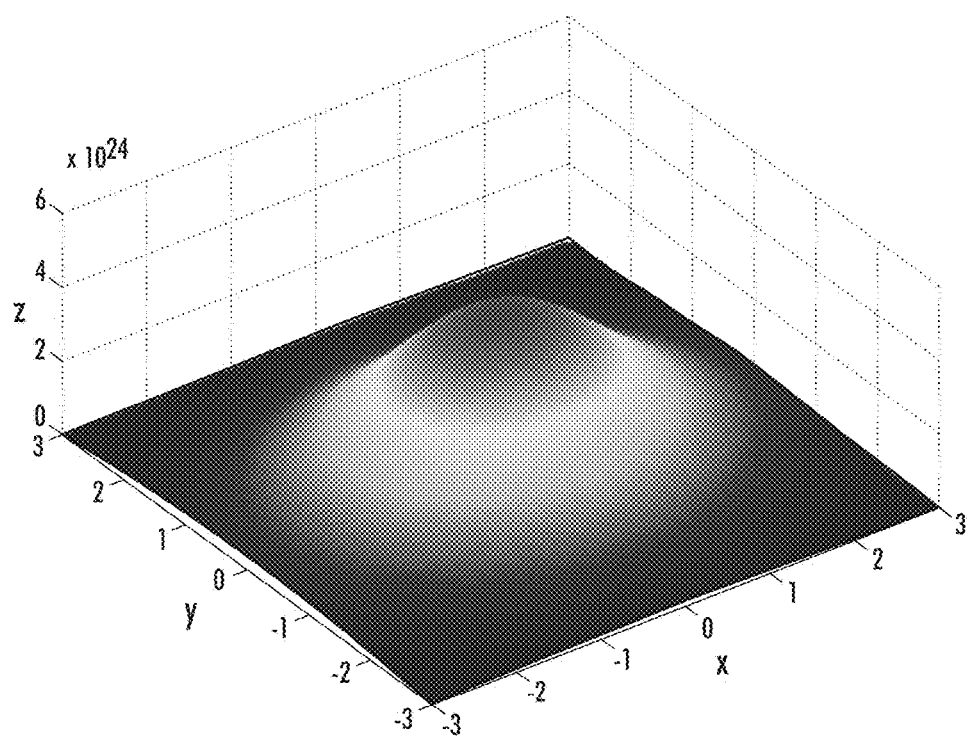
FIG. 15 is a perspective view of a two-dimensional Gaussian function of pixel saturation that may be used to calculate the pixel-dependent amount of added white to an image in an adaptive manner.

The two dimensional Gaussian z function is shown in FIG. 15 for a white point $(x_w, y_w)$ of (0.0,0.0) and $\sigma_x$ and $\sigma_y$ values of 1.0. The value of this function at a σ value radius of 1.0 is 0.367 and at a σ value radius of 2.0 is 0.0183, illustrating the decrease in added white as the pixel value moves out in color saturation.

Figure 16:
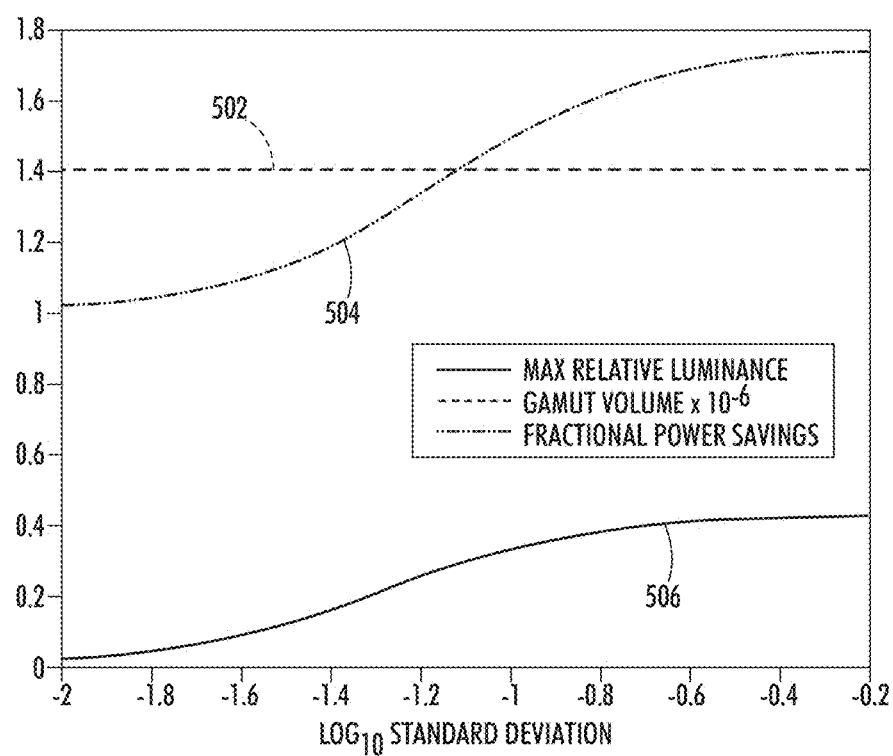
FIG. 16 depicts the dependence of the total gamut volume in CieLUV color space, the relative luminance increase and the power savings achieved for various Gaussian a values of FIG. 15.

(c) The dependence of the total gamut volume in CieLUV color space, the relative luminance increase and the power savings were analyzed for various Gaussian a values and plotted in FIG. 16. This FIG. shows that the total color gamut is preserved, as indicated by gamut line 502. It can also be seen that most of the added luminance 504 and power savings 506 are achieved with a log 10 σ value of −0.6, which is equal to a σ value of 0.25.

Figure 17:
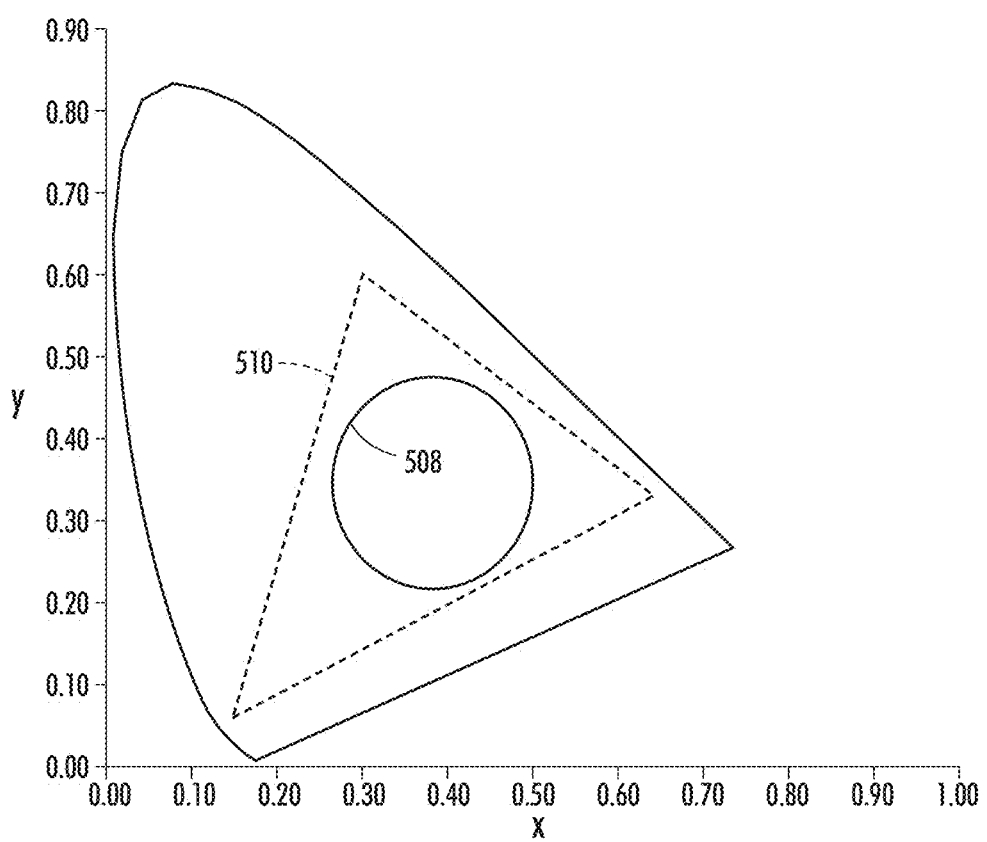
FIG. 17 depicts a chromaticity radius within a color gamut, the chromaticity radius resulting from a chosen $\sigma_x$ and $\sigma_y$ value of a two dimensional Gaussian function.

This is a noteworthy σ value because it is a chromaticity radius that is well inside the sRGB chromaticity plot as shown in FIG. 17. The circle 508 within the color gamut 510 indicates that that the majority of the white is added to lower color saturated pixels that are closer to the display white point (D65 for sRGB), and that the more saturated pixel have no added white so the maximum color saturated pixels are not desaturated. This is highly consistent with the Applicants' color processing methods in general because it is most effective in increasing the low and mid-level pixel color saturation to raise the average color saturation of images.

(d) Grey-level images were created showing the amount of brightness increase for each pixel and the average brightness increase from those images was used to calculate the average image power savings. The average image power savings are shown for two exemplary images in TABLE 2.

TABLE 2

Power savings for two exemplary images for maximum added white values of 1.0 and 2.0 and Gaussian chromaticity sigma value of 0.25

| PHOTOGRAPH SET | | POWER SAVINGS (%) | |
|---|---|---|---|
| FIG. NO. | SUBJECT MATTER | A = 1.0, σ = 0.25 | A = 2.0, σ = 0.25 |
| 19D | Sea of Flowers | 46 | 63 |
| 20D | Snow | 49 | 66 |

Figure 18:
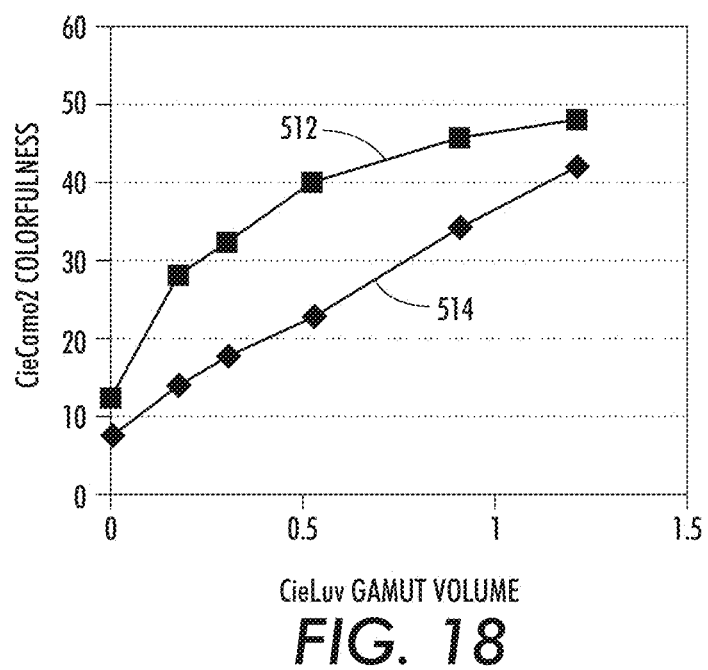
FIG. 18 depicts a comparison of the colorfulness measure with and without the use of one embodiment of the Applicants' color image processing.
Figure 19A:
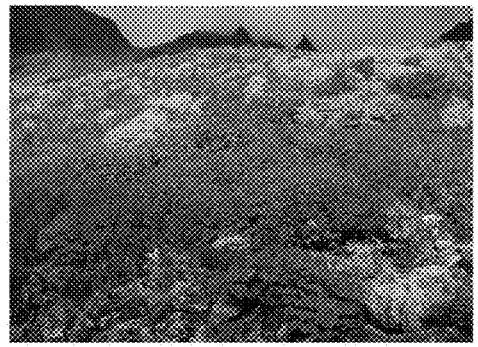
FIGS. 19A-19D and 20A-20D depict comparisons of two exemplary images resulting from the Applicants' color image processing with respective original images and unprocessed images with white added.
Figure 19B:
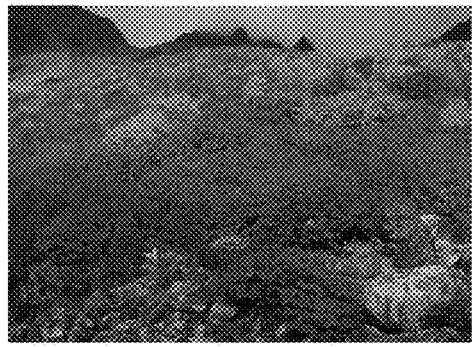
Figure 19C:
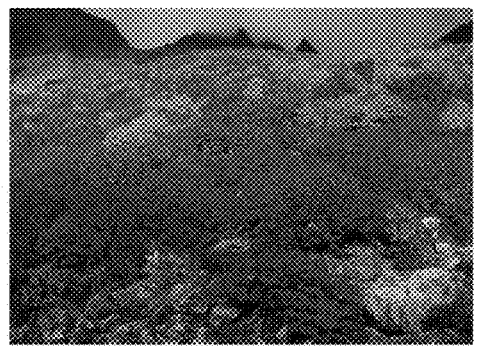
Figure 19D:
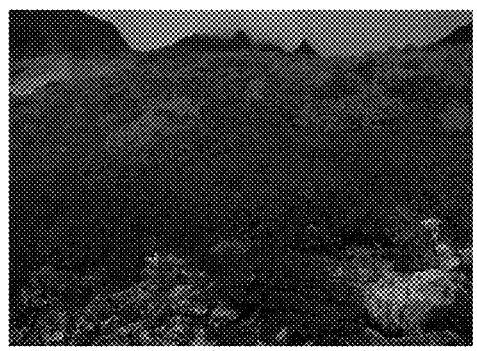
Figure 20A:
Figure 20B:
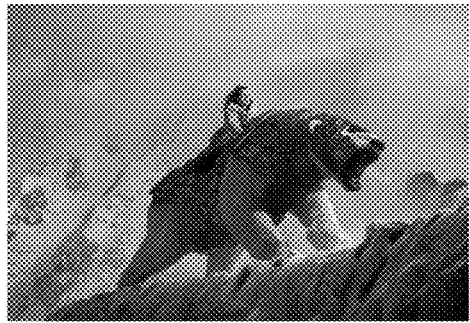
Figure 20C:
Figure 20D:
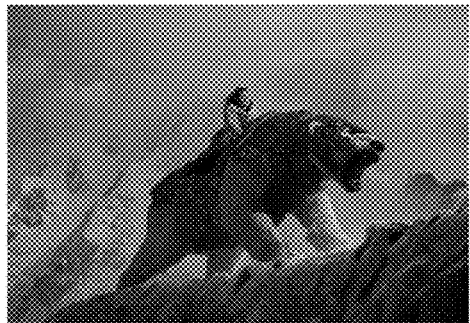

(e) The Applicants' 3DLUTs and chromatic adaptation were used to restore the loss color saturation in the images to which white was added. FIG. 18 shows the colorfulness measure with the Applicants' color image processing (plot 512) and without (plot 514), illustrating the color restoration capability of matching the colorfulness for a display with half the total color gamut. The Applicants' color image processing includes lowering the white point of an image to better match the brightness of white and saturated colors in the image to help in color restoration. Two exemplary images resulting from the Applicants' color image processing are shown in FIGS. 19C and 20C and will be described next in further detail. They represent the final brightness of each pixel after power savings and the use of the Applicants' 3DLUTs and chromatic adaptation.

4.) Simulation Image Analysis and Colorfulness Measure

In one study, in order to judge the effectiveness of restoring the lost color saturation for the Applicants' power savings image processing method, ten experimental images were processed. In addition, a colorfulness measure was calculated that has been shown to be linear with visual rankings across a large number of image types by the Munsell Color Science Laboratory (MCSL) in the Rochester Institute of Technology. This is an important factor in the analysis of the images because the chromaticity color saturation of image pixels are clearly being reduced; in order to achieve favorable perception by a viewer of the image, it is important for to replace that loss in color chromaticity with a measure that is more related to how users see the color quality of the modified panels. The colorfulness measure used in the analysis is not a color gamut area, but rather a statistical measure of how colorful a set of images would be to users throughout the full color gamut volume. It has been shown to be a good measure of visual rankings with a nearly linear relationship from a long history of empirical psychophysical data consolidated from many researchers in the field and under many viewing conditions. This was developed by the CIE in CIECAM02 which in turn was based on the work of many people and discussed in *Color Appearance Modeling for Color Management Systems*, CIE Technical Conference Sep. 1, 2002 by Mark Fairchild and R W Hunt. It is also known generally as a color appearance standard.

Using the Applicants' 3DLUTs that can boost the color saturation using visual models for midrange color saturation levels, this average colorfulness can be increased for any color gamut. Keys for this colorfulness measure are that it is linear with visual rankings and that it covers all of a three-dimensional visual color space, not just a planar slice showing primary vector projection boundaries. It is believed to much better represent an image viewer's color experience for a system than the chromaticity gamut boundary. The Applicants have found that including their color image processing for a small color gamut display produces image results that are more colorful than a 100% larger color gamut display.

5.) Gamut Mapping Method and Hue Preservation

The methods of these analyses can result in hue shifts in the resultant images processed by the Applicants' methods unless the gamut mapping, increased color saturation processing and the addition of white to increase brightness are carried out in a non-uniform hue color space. The gamut mapping component of the lack of hue preservation was reported by Daly, et al in "*Gamut Mapping in LCD backlight compensation*", 16$^{th}$ Color Imaging Conference, May 31, 2011. Others who have attempted to use added white for extra brightness have also faced hue shifts. This is because processing in XYZ chromaticity color space for added white can modify hue significantly because the I hue path in XYZ chromaticity color space is not a straight line between the color primaries and backlight white; in fact it is not a line at all but rather a curved path. For this reason all the gamut mapping, white addition and use of the Applicants' 3DLUTs to increase saturation were done in a uniform hue color space known as IPT. This color space was first defined by Fairchild and Ebner at the 1998 CIC Conference "*Development and Testing of a color space (IPT), with Improved Hue Uniformity*". The Applicants' 3DLUTs are defined in this IPT color space. This enables the lost colorfulness from the addition of white to be restored without artifacts.

6.) Adaptive White Using a Gaussian Function of Pixel Color Saturation

Image Results

Ten images were analyzed ranging from black-white text to highly colorful images to illustrate the variation in power savings and resultant image quality. This was done both for a maximum added white at the display white point of 1.0 and 2.0. The power savings are shown in FIG. 16. Two exemplary image sets from the ten images of the study are provided in FIGS. 19A-19D and 20A-20D. In the image sets, only the restored image results for a maximum added white value of 2.0 are shown because they are visually equivalent to the restored images for a maximum added white value of 1.0.

There are sets of four images shown for each of the two exemplary images that were among the ten included in the analysis: original images are shown in FIGS. 19A-20A; original plus added white without the Applicants' color image processing are shown in FIGS. 19B-20B; original plus added white with the Applicants' color image processing are shown in FIGS. 19C-20C; and grey scale luminance images showing a luminance increase are shown in FIGS. 19D-20D. It can be seen in particular from the pair of original images 19A and 20A in comparison, respectively, to the images of FIGS. 19C and 20C that include processing with the Applicants' 3DLUTs, that the latter images are highly saturated and of superior image quality, while achieving the previously described power savings.

7.) Additional Display Modifications and Examples

In certain embodiments, a display may be modified to reduce power consumption, or to make it brighter while using the same amount of power but also having a resulting smaller color gamut. The modification that is made is dependent upon the type of display. As was described previously, in a liquid crystal display, the red, green, and blue color filters may be changed to make them more transmissive, i.e. to allow them to pass more light within a wavelength range, or a broader portion of the spectrum. Alternatively or additionally, the size of the color filters may be reduced to cover less area in a pixel, thereby allowing more white light to pass. This may have the effect of having a fourth white subpixel, with red, green, and blue being the colored subpixels. Alternatively or additionally, during the duty cycle of operation of a pixel, some of that duty cycle may be used to have all three primary colors on to produce added white.

Alternatively or additionally, a white light source may be added that is independent of the operation of the primary color light sources. For LED displays, this may simply be adding a white LED to each pixel. For LCD displays having white backlights with color filters, this may be done by providing a second light path that allows the primary color light to pass through the filters, or that adds to the filtered light.

Alternatively or additionally, the modulator of the display may be modified so it lets more primary color light through and out of the display. This may be done at the expense of introducing color cross-talk to the red, green and blue color primaries, which may combine to change the color gamut of the display. This may be addressed by displacing the color of the red primary toward green, for example, which will shrink the color gamut.

Alternatively or additionally, a material change in the display optics may be made that causes more light to be diverted outward through the display modulator. Although this may result in some color crosstalk that makes the initial RGB color primaries less "pure."

Alternatively or additionally, in an LCD display, the power of the white backlight may be increased beyond the linearity of the LCD modulator so that color primaries are changed and their brightness is increased.

The above descriptions of modifications to a display for the stated purposes are meant to be exemplary and not limiting. Other modifications to a display are contemplated.

The effects of these display modifications may be compensated for by using three dimensional color tables as described previously and as will now be further illustrated using certain additional examples.

Figure 9:
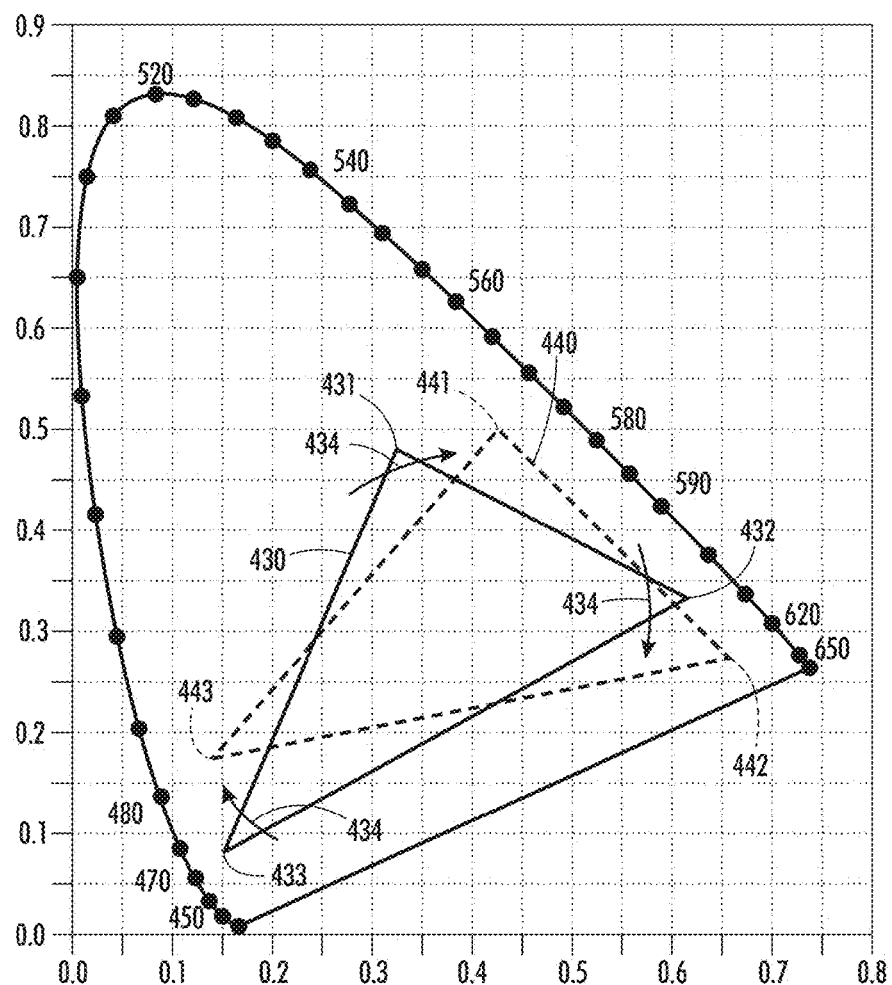
FIG. 9 is a graphical representation of a chromaticity diagram, including a first color gamut transformation that enables a reduction in power consumption by a display, in accordance with the present invention.
Figure 10:
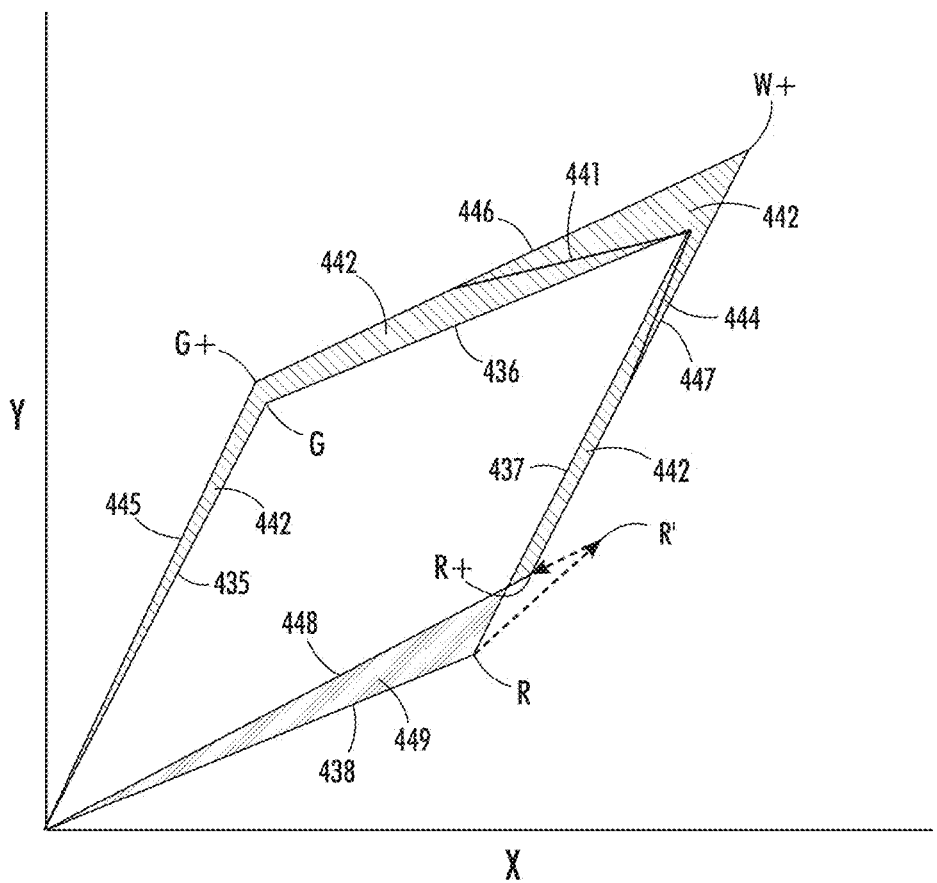
FIG. 10 is a two-dimensional "slice" of the three-dimensional color volumes in the first color gamut transformation depicted in FIG. 9.

FIGS. 9 and 10 depict one option for solving the problem of displaying high quality images on a portable display device over an extended period of time within the constraint of battery life. More specifically, FIG. 9 is a graphical representation of a chromaticity diagram, including a first color gamut transformation that enables a reduction in power consumption by a display, in accordance with the present invention. If the display is powered by a battery, the life of the battery is extended as a result of the reduction in power consumption.

Referring first to FIG. 9, the color gamut 430 of a display device is shown. In a first step to reduce the power used by the display, a color gamut transformation may be performed by changing the primary colors 431, 432, and 433 of the color gamut 430 to new primary colors 441, 442, and 443, which define a new color gamut 440. In certain embodiments, the transformation may be performed by "rotating" the color gamut 430 as indicated by arcuate arrows 434 to produce the new color gamut 440. In certain embodiments, the color gamut 430 may be rotated around the white point, which may be D65. Transforming the color gamut 430 to color gamut 440 having primary colors 441, 442, and 443 has the effect of increasing the white point of the new color gamut 440 when an optimal selection of primary colors 441, 442, and 443 is made.

It is noted that in general, when a color gamut is rotated, the wavelengths that are transmitted are expanded. For example, if red is displaced toward blue via clockwise rotation, then blue is added to the red primary color, making it brighter. Likewise for the blue and green primary colors. To further illustrate this point, it is noted that the "midpoint" colors cyan, magenta and yellow are brighter than red, green and blue. Additionally, if the white point is increased by rotating the color gamut, the color of the white may be changed, i.e. tinted. The Applicants' methods described herein accommodate such a change, correcting the color of an image to the desired appearance.

In addition to this color transformation, the transmittance of the screen of the display device (such as an LCD display) is increased. For the display of a given image, a color correction is applied to input image data in accordance with the methods previously described in this specification. The color correction may be performed according to two different procedures. In a first procedure, the extra brightness of the display resulting from the increase in screen transmittance is maintained, and visual color adaptation using an at least three-dimensional lookup table is performed to adjust the output color data to the new white point of the new color gamut 440. An image is displayed from the color-corrected output image data.

If the new white point of the new color gamut 440 is too different from D65 white, the resulting colors within the new color gamut may appear tinted to an observer of the display. In such circumstances, a second procedure for color correction may be used. In this second procedure the white point of the new color gamut 440 is mapped to the original D65 standard. This will result in the loss of some brightness, but not to a degree that is perceivable by an observer. As in the first procedure, color correction is performed using an at least three-dimensional lookup table to adjust the output color data to correspond to the mapping of the white point of the new color gamut 440 to the D65 white. The output color data is shifted so that to an observer of the display, it looks correct with respect to the new white point. For example, if the new white point has a yellowish tint, then the colors are shifted accordingly toward yellow (i.e. a combination of red and green that is equivalent to yellow).

Referring to FIG. 10, these options are shown in a 2D slice of the three-dimensional color volumes in the color gamut transformation depicted in FIG. 9. The slice depicts the red and green primary colors. The color values of the original color gamut 430 are bounded by the four line segments 435-438. The green primary color G is at the intersection of line segments 435 and 436, and the red primary color R is at the intersection of line segments 437 and 438. The white point W, which may be D65 white, is at the intersection of line segments 436 and 437.

The color gamut 430 is transformed to color gamut 440 as shown in FIG. 9, and the brightness of the display is increased as described above, resulting in new color values of the new color gamut 440. The new color values include a new maximum brightness white point W+, with the white point W of the original color gamut 430 being among the new color values. The new color values also include a new red primary color at R' and a new green primary color G+, which are brighter due in part to the increase of the brightness of the display. In an LCD display, the increased brightness of the respective primary colors may be attained by using more transmissive filters for filtering the backlight of the display, as described previously.

With the increased brightness of the new white point W+, the power to the backlight of the display may be reduced, thereby reducing display power consumption. When this is done, a new red primary color R+ results, and the new color values are bounded by line segments 445-448. It is noted that a similar effect occurs for the green primary color G, which is not shown for the sake of simplicity of illustration. The previously described first and second procedures may be performed to effect a color correction.

In the first procedure, the maximum brightness white W+ may be maintained for use in the display, with visual color adaptation using an at least three-dimensional lookup table being performed to adjust the output color data to the new white point W+. New color values in region 442 are added to the color gamut of the display.

In the second procedure, color mapping is done to map the maximum white W+ back to the original D65 white W. Additionally, a three-dimensional lookup table is used to obtain a smooth color mapping to the original D65 white with the new R+ and G+ primary colors, as indicated by line segments 441 and 444.

It is noted for both of the above first and second procedures, a small region of color gamut 449 is lost in these transformations. This loss of color gamut is not significant with respect to perception by a user of the display.

Figure 11:
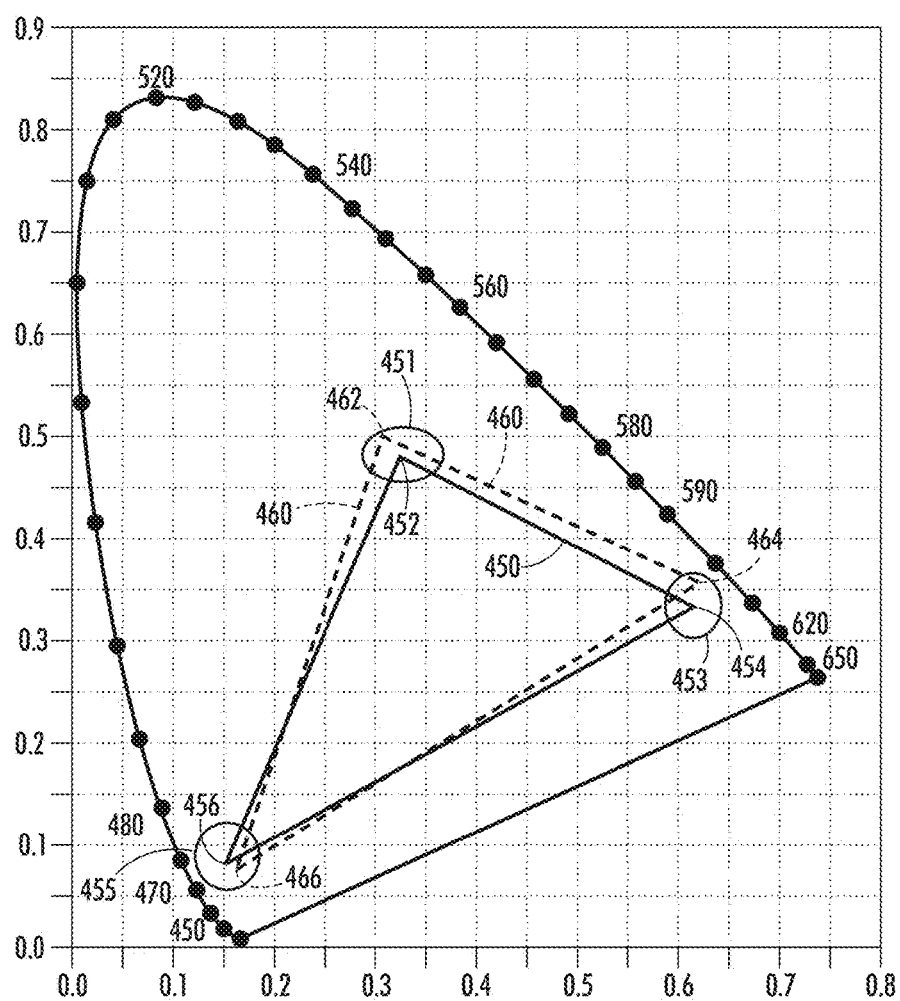
FIG. 11 is a graphical representation of the chromaticity diagram of FIG. 9, including a second color gamut transformation that enables a reduction in power consumption by a display, in accordance with the present invention.

FIG. 11 is a graphical representation of the chromaticity diagram of FIG. 9, including a second color gamut transformation that enables a reduction in power consumption by a display, in accordance with the present invention. A color gamut 450 of a display is shown. Additionally, regions 451, 453, and 455 near respective primary colors 452, 454, and 456 are shown as denoted by ellipses.

In a color transformation to a new color gamut, new primary colors are selected, wherein each of the new primary colors is selected within the regions 451, 453, and 455. For example, a new color gamut 460 is shown comprising new primary colors 462, 464, and 466. The new primary colors are chosen for increased efficiency in that brighter new primary colors are chosen. By choosing such brighter primary colors, the power to the display may be reduced. The regions 451, 453, and 455 may be larger than as shown in FIG. 11, or shaped differently. Additionally, more desaturation of a single primary color, such as blue, may be used. The desaturated color is brighter, and hence the power to the display may be reduced.

As in the previous embodiment depicted in FIG. 10, if the new color gamut 450 is close to enclosing the RGB values of sRGB that is beneficial. More saturation is also beneficial, but may occur at the expense of efficiency. In other words, there is a tradeoff between preserving as much saturation as possible while also obtaining the brightest primary colors, which enable the reduction in power consumption. The Applicants' adaptive method using 3DLUTs is effective because it does not add white to the most saturated pixels, thereby preserving the primary colors and overall color gamut, while adding a greater amount of white to the average pixel to maintain brightness while reducing power consumption.

Any color values within the new color gamut 460 may be corrected by the use of three dimensional lookup tables according to the methods described previously in this specification. The methods described and shown in FIG. 10 with regard to a new white point and increased brightness are also applicable to the color gamut 460. As described previously, because the primary colors of the new color gamut 460 are brighter, the power to the display may be reduced while maintaining the original brightness of the display.

Figure 12:
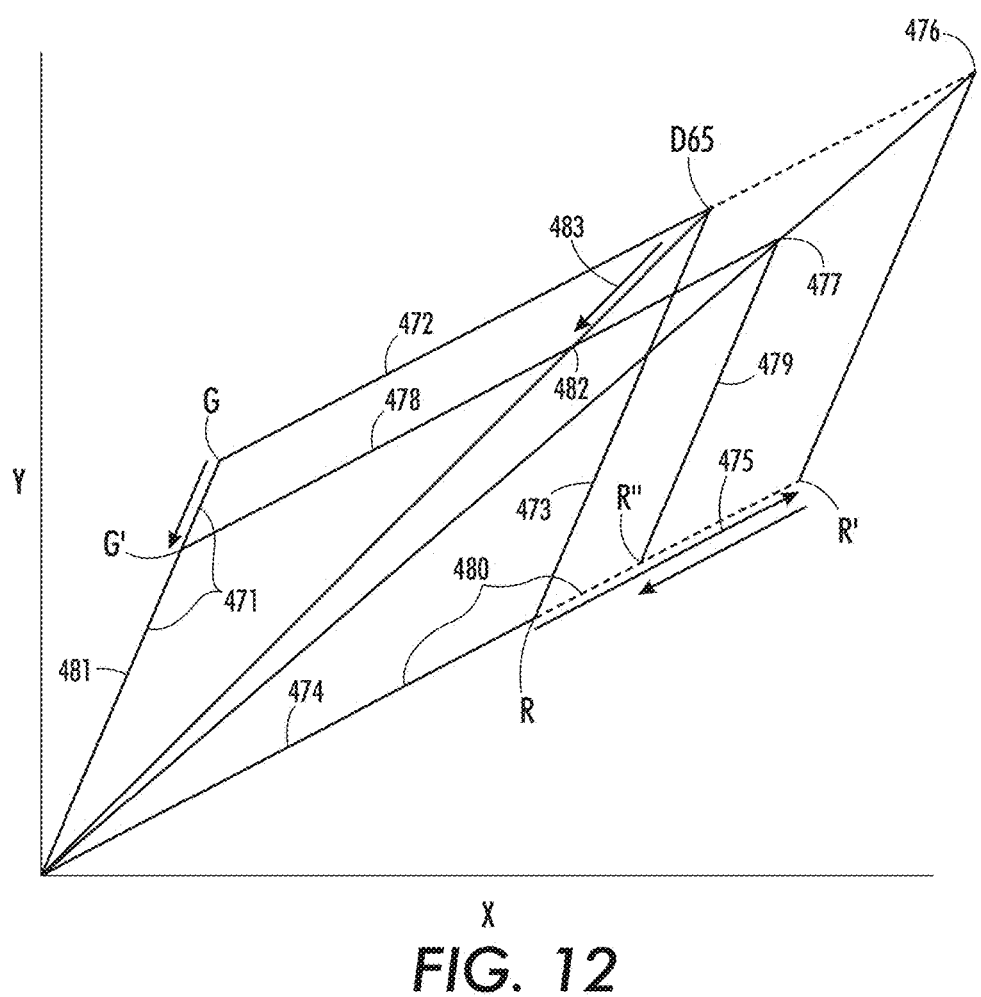
FIG. 12 is a is a two-dimensional "slice" of the three-dimensional color volume resulting from a third color gamut transformation in accordance with the present invention.

FIG. 12 is a two-dimensional "slice" of the three-dimensional color volume resulting from a third color gamut transformation in accordance with the present invention. In this transformation, the transmittance of one primary color in the display is increased. In other words the brightness of the one primary color is increased. In an LCD display, the increased brightness of the primary color may be attained by using a more transmissive filter for filtering the backlight of the display.

Referring to FIG. 12, and in the example depicted therein, the original color values of the color gamut of the display are bounded by line segments 471, 472, 473, and 474, with a D65 white point. The brightness of the red primary color is increased from R to R' as indicated by arrow 475. This results in a new white point 476 that is brighter but appears to have a reddish tint to an observer of the display.

One of several color corrections may be performed at this point. In a first correction, the backlight of the display is reduced, thereby reducing the power of the display. Additionally, chromatic adaptation from a visual model of the human visual system is used to produce an at least three-dimensional lookup table, which is used to adjust the output color data to the new white point 477 of the new color gamut of the display. The "slice" of the new color gamut produced by this color correction is bounded by line segments 478, 479, 480, and 481, and the red and green primary colors are R" and G'.

In a second color correction, the original D65 white may be mapped to a new dimmer white 482 as indicated by arrow 483. In this color correction, the new maximum brightness may remain as a reddish white which may be similar to reducing the white point, i.e., the maximum red brightness may appear very red. A slightly reddish white for the white point is acceptable to an observer with the use of the Applicants' 3DLUT with chromatic adaptation to shift all the colors toward red, thereby maintaining the visual color relationships of the image as perceived by the observer.

In a third color correction, a combination of the above first and second color corrections may be performed.

Figure 13:
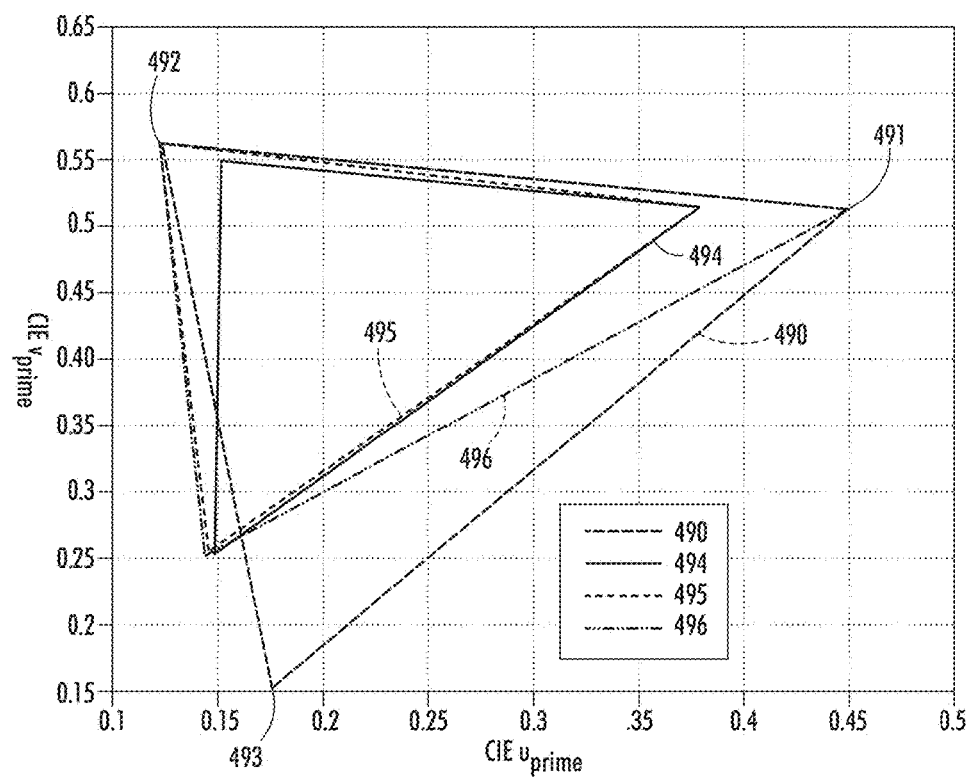
FIG. 13 is a graphical representation of a set of color gamut transformations in which the saturation or brightness of primary colors is reduced, which enable a reduction in power consumption by a display, in accordance with the present invention.

FIG. 13 is a graphical representation of an exemplary set of color gamuts in which the saturation of primary colors is reduced, which enable a reduction in power consumption by a display, in accordance with the present invention.

For reference, the standard sRGB color gamut 490 is shown in coarse dotted line format and having respective red, green, and blue primary colors 491, 492, and 493. A color display that has an sRGB color gamut 490 may be provided. The power consumed by the display may be reduced by reducing the saturation and/or brightness of the primary colors 491-493, as indicated by color gamut 494 in solid line. However, the overall aesthetic appeal of images on the display will be less satisfactory. As a first alternative, the saturation and/or brightness of the blue and the red primary colors may be reduced, and the sRGB green primary color maintained. This results in color gamut 495 shown in fine dotted line, with a significant reduction in power being attained. To obtain color that is satisfactory to an observer of the display, as described previously in this specification, color correction is performed using an at least three-dimensional lookup table to adjust the output color data to correspond to the mapping of the white point of the new color gamut 494. The three-dimensional lookup table may be determined from a visual model of the human visual system including chromatic adaptation of the HVS.

As a second alternative, the saturation and/or brightness of only the blue primary color may be reduced, and the sRGB green and red primary colors maintained. This results in color gamut 496 shown in medium dotted line, with a significant reduction in power still being attained. To obtain color that is satisfactory to an observer, color correction is performed as recited above for color gamut 495.

In all of the above alternatives, the reduction in saturation is achieved by an increase in brightness by the methods described herein. Subsequently, the power to the display is reduced, thereby reducing the brightness back to approximately the original levels. The Applicants' 3DLUTs are used to adaptively restore the desired levels of saturation to the individual pixels, resulting in an image that is perceived to be of comparable colorfulness to that of the original image. The instant methods are applicable to all types of image displays and image projectors.

It is, therefore, apparent that there has been provided, in accordance with the present invention, methods and devices for producing a color image. Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

We claim:

1. A method of producing a color image using a display device comprised of image pixels comprising red, green, and blue primary color subpixels and an additional color subpixel, the method comprising:
   a) providing data of an input image comprised of image pixels comprising red, green, and blue primary colors, to at least one of a computer readable storage medium, memory, or central processing unit of an imaging color rendering controller in communication with the display device;
   b) within at least one of an external processor, or the computer readable storage medium, memory, or central processing unit of the image color rendering controller, generating a first three-dimensional look-up table of addresses containing values of input colors and corresponding output colors, wherein the input colors are defined by tristimulus values of the red, green, and blue primary colors, and wherein for each input color tristimulus value, a corresponding output color is defined by values of the red, green, and blue primary colors, and the additional color;
   c) via the central processing unit, loading the first three-dimensional look-up table into the image color rendering controller;
   d) in the central processing unit, executing an algorithm to operate on the data of the image pixels of the input image using the values of input colors and output colors of the first three-dimensional look-up table to produce output image color values; and
   e) outputting the output image color values to the display pixels of the display device to produce an output color image that is perceived to have at least one of improved viewing quality of brightness, contrast, and colorfulness compared to the input image.

2. The method of claim 1, wherein the algorithm to produce output image color values is based upon a model of human visual system perceptual adaptation.

3. The method of claim 2, wherein the output image color values produced are defined by including chromatic adaptation of the human visual system to a specified white point that increases the brightness of the image rendering unit.

4. The method of claim 1, wherein the input image contains memory colors and non-memory colors, and the method comprises identifying the memory colors in the input image to be maintained, characterizing the memory colors and non-memory colors with respect to their chromaticities, and producing the output color image on the display device with maintained memory colors.

5. The method of claim 1, wherein the additional color is yellow.

6. The method of claim 1, wherein the additional color is a white.

7. The method of claim 6, wherein the white is D65 white.

8. The method of claim 6, further comprising: A method of producing an output color image using a display device comprised of image pixels comprising red, green, and blue primary color subpixels and an additional color subpixel, the method comprising:
   a) providing data of an input image comprised of image pixels comprising red, green, and blue primary colors, to at least one of a computer readable storage medium, memory, or central processing unit of an imaging color rendering controller in communication with the display device;
   b) within at least one of an external processor, or the computer readable storage medium, memory, or central processing unit of the image color rendering controller, generating a first three-dimensional look-up table of addresses containing values of input colors and corresponding output colors, wherein the input colors are defined by tristimulus values of the red, green, and blue primary colors, and wherein for each input color tristimulus value, a corresponding output color is defined by values of the red, green, and blue primary colors, and the additional color;
   c) via the central processing unit, loading the first three-dimensional look-up table into the image color rendering controller;
   d) in the central processing unit, executing an algorithm to:
      i) operate on the data of the image pixels of the input image using the values of input colors and output colors of the first three-dimensional look-up table to produce first output image color values;
      ii) increase brightness and reduce color saturation of the first output image color values relative to a base level by adding the white adaptively including instructions by which the amount of white added decreases with increasing color saturation to produce second output image color values;
iii) decrease power to the display device to reduce the brightness of the output color image; and
iv) restore color saturation of the output color image to the base level by modifying the second output image color values using a second three-dimensional lookup table to produce third output image color values; and
e) outputting the third output image color values to the display pixels of the display device to produce the output color image, the image perceived to have at least one of improved viewing quality of brightness, contrast, and colorfulness compared to the input image.

9. The method of claim 8, wherein decreasing power to the display device reduces the brightness of the output color image to a level brighter than the base level.

10. The method of claim 8, wherein the algorithm instructions by which the amount of white added decreases with increasing color saturation includes a Gaussian function that defines the decrease in white with increasing color saturation.

11. A method of producing a color image using a display device comprised of a color light source and image pixels, each of the image pixels comprising red, green, and blue primary color subpixels, the color of each of the image pixels defined by its red, green, and blue primary color subpixels and light received from the color light source, the method comprising:
a) providing data of an input image comprised of image pixels comprising red, green, and blue primary colors, to at least one of a computer readable storage medium, memory, or central processing unit of an imaging color rendering controller in communication with the display device;
b) within at least one of an external processor, or the computer readable storage medium, memory, or central processing unit of the image color rendering controller, generating a first three-dimensional look-up table of addresses containing values of input colors and corresponding output colors, wherein the input colors are defined by tristimulus values of the red, green, and blue primary colors, and wherein for each input color tristimulus value, a corresponding output color is defined by values of the red, green, and blue primary colors, and the light received from the color light source;
c) via the central processing unit, loading the first three-dimensional look-up table into the image color rendering controller;
d) in the central processing unit, executing an algorithm to operate on the data of the image pixels of the input image using the values of input colors and output colors of the first three-dimensional look-up table to produce output image color values; and
e) outputting the output image color values to the display pixels of the display device to produce an output color image that is perceived to have at least one of improved viewing quality of brightness, contrast, and enhanced colorfulness compared to the input image.

12. The method of claim 11, wherein the display device is an LCD display device and the color light source is a backlight of the LCD display device.

13. The method of claim 11, wherein the algorithm to produce output image color values is based upon a model of human visual system perceptual adaptation.

14. The method of claim 13, wherein the output image color values produced are defined by including chromatic adaptation of the human visual system to a specified white point that increases the brightness of the image rendering unit.

15. The method of claim 11, wherein the input image contains memory colors and non-memory colors, and the method comprises identifying the memory colors in the input image to be maintained, characterizing the memory colors and non-memory colors with respect to their chromaticities, and producing the output color image on the display device with maintained memory colors.

16. The method of claim 11, wherein the additional color is yellow.

17. A method of producing a color image using a display device comprised of a white light source and image pixels, each of the image pixels comprising red, green, and blue primary color subpixels, the color of each of the image pixels defined by its red, green, and blue primary color subpixels and light received from the white light source, the method comprising:
a) providing data of an input image comprised of image pixels comprising red, green, and blue primary colors, to at least one of a computer readable storage medium, memory, or central processing unit of an imaging color rendering controller in communication with the display device;
b) within at least one of an external processor, or the computer readable storage medium, memory, or central processing unit of the image color rendering controller, generating a first three-dimensional look-up table of addresses containing values of input colors and corresponding output colors, wherein the input colors are defined by tristimulus values of the red, green, and blue primary colors, and wherein for each input color tristimulus value, a corresponding output color is defined by values of the red, green, and blue primary colors, and the light received from the white light source;
c) via the central processing unit, loading the first three-dimensional look-up table into the image color rendering controller;
d) in the central processing unit, executing an algorithm to:
i) operate on the data of the image pixels of the input image using the values of input colors and output colors of the first three-dimensional look-up table to produce first output image color values;
ii) increase brightness and reduce color saturation of the first output image color values relative to a base level by adding the white adaptively including instructions by which the amount of white added decreases with increasing color saturation to produce second output image color values;
iii) decrease power to the display device to reduce the brightness of the color image; and
iv) restore color saturation of the output color image to the base level by modifying the second output image color values using a second three-dimensional lookup table to produce the third output color values; and
e) outputting the third output image color values to the display pixels of the display device to produce the output color image, the image perceived to have at least one of improved viewing quality of brightness, contrast, and colorfulness compared to the input image.

18. The method of claim 17, wherein the white is D65 white.

19. The method of claim 17, wherein decreasing power to the display device reduces the brightness of the color image to a level brighter than the base level.

20. The method of claim 17, wherein the algorithm instructions by which the amount of white added decreases with increasing color saturation includes a Gaussian function that defines the decrease in white with increasing color saturation.

21. A method of producing an output color image using a display device comprised of a color light source and image pixels, each of the image pixels comprising red, green, and blue primary color subpixels, the color of each of the image pixels defined by its red, green, and blue primary color subpixels and light received from the color light source, the method comprising:
   a) providing data of an input image comprised of image pixels comprising red, green, and blue primary colors, to at least one of a computer readable storage medium, memory, or central processing unit of an imaging color rendering controller in communication with the display device;
   b) within at least one of an external processor, or the computer readable storage medium, memory, or central processing unit of the image color rendering controller, generating a first three-dimensional look-up table of addresses containing values of input colors and corresponding output colors, wherein the input colors are defined by tristimulus values of the red, green, and blue primary colors, and wherein for each input color tristimulus value, a corresponding output color is defined by values of the red, green, and blue primary colors, and the light received from the color light source;
   c) via the central processing unit, loading the first three-dimensional look-up table into the image color rendering controller;
   d) in the central processing unit, executing an algorithm to:
      i) operate on the data of the image pixels of the input image using the values of input colors and output colors of the first three-dimensional look-up table to produce first output image color values;
      ii) increase brightness of the output color image and reduce color saturation of the output color image relative to a base level by adding the white adaptively including instructions by which the amount of white added decreases with increasing color saturation to produce second output image color values;
      iii) decrease power to the display device to reduce brightness of the output color image;
      iv) restore color saturation of the output color image to the base level by modifying the second output image color values using a second three-dimensional lookup table to produce third output image color values; and
   e) outputting the third output image color values to the display device to produce the output color image.

22. The method of claim 21, wherein the output color image is perceived to have at least one of enhanced brightness, enhanced contrast, and enhanced colorfulness compared to the input image.

23. The method of claim 22, wherein the algorithm to produce output image color values is based upon a model of human visual system perceptual adaptation.

24. The method of claim 23, wherein the output image color values produced are defined by including chromatic adaptation of the human visual system to a specified white point that increases the brightness of the image rendering unit.

25. The method of claim 22, wherein the input image contains memory colors and non-memory colors, and the method comprises identifying the memory colors in the input image to be maintained, characterizing the memory colors and non-memory colors with respect to their chromaticities, and producing the output color image on the display device with maintained memory colors.

* * * * *

UNITED STATES PATENT AND TRADEMARK OFFICE
CERTIFICATE OF CORRECTION

PATENT NO. : 9,529,409 B2  
APPLICATION NO. : 14/511536  
DATED : December 27, 2016  
INVENTOR(S) : Sullivan et al.

Page 1 of 1

It is certified that error appears in the above-identified patent and that said Letters Patent is hereby corrected as shown below:

In the Claims

Column 44, Line 33, delete "The method of claim 6, further comprising:"

Column 45, Line 3, delete "the" following "reduce"

Column 46, Line 54, delete "the" following "reduce"

Signed and Sealed this
Fourteenth Day of March, 2017

Michelle K. Lee
*Director of the United States Patent and Trademark Office*